US007653294B2

(12) United States Patent
Ishii et al.

(10) Patent No.: US 7,653,294 B2
(45) Date of Patent: Jan. 26, 2010

(54) IMAGE BLUR CORRECTION APPARATUS, LENS APPARATUS AND IMAGE PICKUP APPARATUS

(75) Inventors: Atsuya Ishii, Kanagawa (JP); Tsutomu Naitou, Kanagawa (JP)

(73) Assignee: Sony Corporation (JP)

( * ) Notice: Subject to any disclaimer, the term of this patent is extended or adjusted under 35 U.S.C. 154(b) by 301 days.

(21) Appl. No.: 11/698,273

(22) Filed: Jan. 25, 2007

(65) Prior Publication Data

US 2007/0206934 A1 Sep. 6, 2007

(30) Foreign Application Priority Data

Jan. 30, 2006 (JP) ........................... P2006-021468

(51) Int. Cl.
*G03B 17/00* (2006.01)

(52) U.S. Cl. .................................... 396/55; 348/208.11

(58) Field of Classification Search .................. 396/55; 348/208.11, 208.7, 208.4
See application file for complete search history.

(56) References Cited

U.S. PATENT DOCUMENTS 5,488,603 A * 1/1996 Tomita et al. ............... 720/683
5,930,744 A * 7/1999 Koch et al. .................. 702/170
6,631,042 B2 * 10/2003 Noguchi ..................... 359/823
6,747,921 B2 * 6/2004 Wakabayashi et al. ... 369/44.16
7,375,908 B2 * 5/2008 Takahashi ................... 359/819
2005/0134420 A1 * 6/2005 Nakao et al. ................ 336/234
2006/0285840 A1 * 12/2006 Takahashi .................... 396/55

FOREIGN PATENT DOCUMENTS

JP 03-186823 A 8/1991
JP 03-188430 A 8/1991
JP 10-311995 A 11/1998

* cited by examiner

*Primary Examiner*—W B Perkey
*Assistant Examiner*—Noam Reisner
(74) *Attorney, Agent, or Firm*—Lerner, David, Littenberg, Krumholz & Mentlik, LLP

(57) ABSTRACT

An image blur correction apparatus includes a correction lens, a first guide section, a second guide section, a first driving section, a second driving section, and a position detection section. In the image blur correction apparatus, the first and second driving section has first and second coils, a magnet to apply magnetic force to the first and second coils, and a yoke to support the magnet. The two coils are disposed in an intersecting and overlapping relationship with each other such that the direction of propelling force generated by the first coil and the direction of propelling force generated by the second coil are directed to the first direction and the second direction, respectively. The position detection section detects the magnetic force of the magnet to detect the position of the correction lens.

13 Claims, 23 Drawing Sheets

100
104
1
7A
114
133
132
131
134
115
116
108
102a
113
112
137
136
105
106
111
107
102
109
121
117
120

100
1
7A
108
114
115
116
103
134
107
122
113
112
123
106
101
140
125
111
104c
105
136
137
102
142
126
141
104a
104
127
104b 150
151
IMAGE BLUR CORRECTION ARITHMETIC OPERATION SECTION
ANALOG SERVO SECTION
152
153
DRIVING CIRCUIT SECTION
154A
AMP
154B
AMP
155A
AMP
155B
AMP
FIRST GYRO SENSOR
156
SECOND GYRO SENSOR
157
FIRST POSITION DETECTION ELEMENT
41
SECOND POSITION DETECTION ELEMENT
42
FIRST DIRECTION DRIVING COIL
33
SECOND DIRECTION DRIVING COIL
34

100
1
2
15
3
4
CCD
164
ANALOG SIGNAL PROCESSING SECTION
166
A/D
165
DIGITAL SIGNAL PROCESSING SECTION
120
DISPLAY APPARATUS
163
EXTERNAL MEMORY
160
CONTROL SECTION
161
STORAGE APPARATUS
162
OPERATION SECTION
169
TG
168
D/A
167
A/D
IMAGE BLUR CORRECTION APPARATUS
5
POSITION DETECTION SECTIONS
41,42
DRIVING CONTROL SECTION (SERVO ARITHMETIC OPERATION SECTION)
172
SHAKE DETECTION SECTION (GYRO SENSOR)
171

100A
3
2
15
1
4
184
IMAGE BLUR CORRECTION APPARATUS
5
POSITION SENSORS
41,42
CORRECTION LENS CONTROL SECTION
182
I/F
188
ACCELERATION SENSOR
191
IMAGE SIGNAL PROCESSING SECTION
181
IMAGE RECORDING/ REPRODUCTION CIRCUIT SECTION
180
I/F
187
189
LCD
120
MONITOR DRIVING SECTION
183
BUILT-IN MEMORY
161
I/F
186
EXTERNAL MEMORY
163
185
102

IMAGE BLUR CORRECTION APPARATUS, LENS APPARATUS AND IMAGE PICKUP APPARATUS

CROSS-REFERENCE TO RELATED APPLICATIONS

This application claims priority from Japanese Patent Application No. JP 2006-021468 filed in the Japanese Patent Office on Jan. 30, 2006, the entire content of which is incorporated herein by reference.

BACKGROUND OF THE INVENTION

1. Field of the Invention

This invention relates to an image blur correction apparatus for correcting image blur caused by a shake, vibrations or the like of an image pickup apparatus upon image pickup by such control as to move, upon occurrence of such a shake or the like of the image pickup apparatus, a correction lens in a direction perpendicular to an optical axis of a lens system so that the optical axis of the correction lens may be brought into alignment with the optical axis of the lens system. The present invention further relates to a lens apparatus having an image blur correction apparatus of the type described and an image pickup apparatus which includes a lens apparatus of the type described.

2. Description of the Related Art

In recent years, image pickup apparatus such as digital still cameras and video cameras have exhibited remarkable enhancement in performance, and now, everybody can simply pick up a still picture or a moving picture of high picture quality and high performance. Such enhancement in performance of image pickup apparatus relies much upon improvement in performance of a lens, a CCD element (solid-state image pickup element) and an image processing circuit.

However, in whatever manner the performance of a lens, a CCD element and so forth is improved, if a shake or a sway occurs with a hand which supports the camera (image pickup apparatus), then a shake occurs with a screen especially having a high resolution, resulting in blur of a picked up image. Therefore, some comparatively high-priced cameras incorporate an image blur correction apparatus for correcting image blur which arises from a shake or the like of the image pickup apparatus upon image pickup. However, such image blur correction as described is demanded originally not by such a high class model as is used by a professional who professionally picks up an image but by the majority of the public who have rather poor image pickup experience. In other words, the image blur correction is demanded by image pickup apparatus of popular models.

Further, strong demands for reduction in size and weight are directed to cameras (image pickup apparatus), and generally cameras which are light in weight and easy to handle are used favorably. However, existing image blur correction apparatus have a comparatively great size. Therefore, if an existing image blur correction apparatus is incorporated in a camera body, then the camera comes to have a correspondingly increased size, contrary to the demand for reduction in size and weight. Besides, existing image blur correction apparatus require a large number of parts and have a problem that a high cost is demanded by the increased number of parts.

A lens apparatus of the type described is disclosed, for example, in Japanese Patent Laid-Open No. Hei 3-186823 (hereinafter referred to as Patent Document 1). In particular, Patent Document 1 discloses a lens apparatus which incorporates an anti-vibration apparatus disposed in a camera or the like for detecting vibrations of a comparatively low frequency and preventing image blur using the detected vibrations as information for image blur prevention. The anti-vibration apparatus disclosed in Patent Document 1 is hereinafter referred to as first background art apparatus. The first background art apparatus is a camera anti-prevention apparatus including a correction optical mechanism disposed in a lens barrel having lens groups held thereon and configured to displace the optical axis of the lens groups, a vibration detection section configured to detect vibrations applied to the lens barrel, and an anti-vibration control section configured to drive the correction optical mechanism based on a signal from the vibration detection section to perform anti-prevention action. The correction optical system includes a correction lens, a fixing frame configured to fix the correction lens thereto, a first holding frame configured to hold the fixing frame for movement in a first direction different from the direction of the optical axis of the lens groups, a second holding frame secured to the lens barrel and configured to hold the first holding frame for movement in a second direction different from the direction of the optical axis and the first direction, first and second driving sections including first and second coils and first and second magnetic field generation members opposing to the first and second coils and configured to move the first and second holding frames in the first and second directions, respectively, and first and second position detection sections configured to detect the amounts of movement of the fixing frame and the first holding frame in the first and second directions, respectively. At least one of the first and second magnetic field generation members and the first and second position detection means is provided on a fixed member secured to the lens barrel and including the second holding frame.

According to the anti-vibration apparatus disclosed in Patent Document 1 which has such a configuration as described above, an advantage can be anticipated that the anti-vibration apparatus can respond to vibrations of high frequencies without the increase of the cost and without the necessity for a large space.

Another existing lens apparatus is disclosed, for example, in Japanese Patent Laid-Open No. Hei 3-188430 (hereinafter referred to as Patent Document 2). In particular, Patent Document 2 discloses an image blur suppression apparatus for a camera for use for suppression of vibrations of the camera to which vibrations of comparative low frequencies are applied. The image blur suppression apparatus disclosed in Patent Document 2 is hereinafter referred to as second background art apparatus. The second background art apparatus determines, based on detection information of vibrations produced on a lens barrel, a correction amount for displacement of an optical axis necessary for suppression of image blur on an image plane and controlling the movement of a correction optical system, which is supported in a floating fashion so as to be movable in a diametrical direction with respect to the lens barrel, in accordance with the correction amount. The second background art apparatus includes a first holding frame configured to support the correction optical system in a floating fashion so as to support the correction optical system for movement in a first direction defined in a plane perpendicular to the optical axis but against movement in any other direction, and a second holding frame configured to support the first holding frame for movement in a second direction different from the first direction within the plane but against movement in any other direction. The second holding frame is secured to the lens barrel.

According to the anti-vibration apparatus for a camera disclosed in Patent Document 2 which has such a configuration as described above, an advantage can be anticipated that a problem of an out-of-focus state upon suppression of image blur is eliminated because the correction optical mechanism for displacing the optical axis in order to suppress image blur can be supported against movement by a configuration which does not provide a component of movement in the direction of the optical axis to the correction lens.

A further existing lens apparatus is disclosed, for example, in Japanese Patent Laid-Open No. Hei 10-311995 (hereinafter referred to as Patent Document 3). In particular, Patent Document 3 discloses a lens driving apparatus for an optical apparatus which is hereinafter referred to as third background art apparatus. The third background art apparatus is a lens driving apparatus which includes a first driving section configured to drive a lens accommodating section in which a lens is held in a first direction within a plane perpendicular to the optical axis of the lens, and a second driving section configured to drive the lens accommodating section in a second direction perpendicular to the first direction within the plane. The first and second driving sections are disposed along an axis parallel to the optical axis of the lens.

According to the lens driving apparatus disclosed in Patent Document 3 which has such a configuration as described above, an advantage can be anticipated that reduction in size of the lens driving apparatus for driving a correction lens for correcting blur of an image can be achieved (refer to paragraph [0039] of the Patent Document 3).

However, in all of the first to third background art apparatus, in order to detect the position of the correction lens, a position detection section formed from a combination of a light emitting element such as a light emitting diode and a light receiving element such as a semiconductor detection element is provided. Uneconomically, a great number of parts are demanded for the position detection section and also an increased number of assembly steps are requisite, which gives rise to a problem of increase of the cost.

SUMMARY OF THE INVENTION

Therefore, it is demanded to provide an image blur correction apparatus which eliminates the problem of such background art image blur correction apparatus described above that an increased cost is requisite because a position detection section for detecting the position of a correction lens is formed from a great number of parts and produced by an increased number of assembly steps and so forth.

According to an embodiment of the present invention, there is provided an image blur correction apparatus which may include a correction lens capable of moving in a direction perpendicular to an optical axis of a lens system which includes one or more lenses, a first guide section configured to guide the correction lens in a first direction perpendicular to the optical axis of the lens system, a second guide section configured to guide the correction lens in a second direction perpendicular to the optical axis of the lens system and also to the first direction, a first driving section configured to move the correction lens along the first guide section, a second driving section configured to move the correction lens along the second guide section, and a position detection section configured to detect the position of the correction lens. In the image blur correction apparatus, the first and second driving sections may be composed of first and second coils, a magnet configured to apply magnetic force to the first and second coils, and a yoke configured to support the magnet The first and second coils are disposed in an intersecting relationship with each other and in an overlapping relationship with each other such that the direction of propelling force generated by a propelling force generation portion of the first coil and the direction of propelling force generated by a propelling force generation portion of the second coil both by action of the magnetic force of the magnet are directed to the first direction and the second direction, respectively. The position detection section detects the magnetic force of the magnet to detect the position of the correction lens.

According to another embodiment of the present invention, there is provided a lens apparatus which may include a lens barrel configured to support a lens system including one or more lenses fixedly and/or movably, and an image blur correction apparatus including a correction lens removably mounted in the lens barrel and movable in a direction perpendicular to an optical axis of the lens system. In the lens apparatus, the image blur correction apparatus may include a first guide section configured to guide the correction lens in a first direction perpendicular to the optical axis of the lens system, a second guide section configured to guide the correction lens in a second direction perpendicular to the optical axis of the lens system and also to the first direction, a first driving section configured to move the correction lens along the first guide section, a second driving section configured to move the correction lens along the second guide section, and a position detection section configured to detect the position of the correction lens. In the image blur correction apparatus, the first and second driving sections are composed of first and second coils, a magnet configured to apply magnetic force to the first and second coils, and a yoke configured to support the magnet. The first and second coils are disposed in an intersecting relationship with each other and in an overlapping relationship with each other such that the direction of propelling force generated by a propelling force generation portion of the first coil and the direction of propelling force generated by a propelling force generation portion of the second coil both by action of the magnetic force of the magnet are directed to the first direction and the second direction, respectively. The position detection section detects the magnetic force of the magnet to detect the position of the correction lens.

According to a further embodiment of the present invention, there is provided an image pickup apparatus which may include a lens apparatus including a lens barrel configured to support a lens system including one or more lenses fixedly and/or movably and an image blur correction apparatus including a correction lens removably mounted in the lens barrel and movable in a direction perpendicular to an optical axis of the lens system. In the image pickup apparatus, the image blur correction apparatus may include a first guide section configured to guide the correction lens in a first direction perpendicular to the optical axis of the lens system, a second guide section configured to guide the correction lens in a second direction perpendicular to the optical axis of the lens system and also to the first direction, a first driving section configured to move the correction lens along the first guide section, a second driving section configured to move the correction lens along the second guide section, and a position detection section configured to detect the position of the correction lens. The first and second driving sections may be composed of first and second coils, a magnet configured to apply magnetic force to the first and second coils, and a yoke configured to support the magnet. The first and second coils may be disposed in an intersecting relationship with each other and in an overlapping relationship with each other such that the direction of propelling force generated by a propelling force generation portion of the first coil and the direction of propelling force generated by a propelling force generation portion of the second coil both by action of the magnetic force of the magnet are directed to the first direction and the second direction, respectively. The position detection section detects the magnetic force of the magnet to detect the position of the correction lens.

In the image blur correction apparatus, lens apparatus and image pickup apparatus, the first and second driving sections may be composed of the first and second coils, magnet and yoke. The first and second coils may be disposed in an intersecting relationship with each other and in an overlapping relationship with each other such that the direction of propelling force generated by the propelling force generation portion of the first coil and the direction of propelling force generated by the propelling force generation portion of the second coil both by action of the magnetic force of the magnet are directed to the first direction and the second direction, respectively. The position detection section may detect the magnetic force of the magnet to detect the position of the correction lens.

Consequently, with the image blur correction apparatus, lens apparatus and image pickup apparatus, the position of the correction lens can be detected using the magnet use in the driving sections. Therefore, reduction in number of parts and simplification in structure can be achieved, and reduction in size of the image blur correction apparatus can be achieved. As a result of the reduction in size of the image blur correction apparatus, reduction in size and weight of the lens apparatus and the image pickup apparatus can be achieved.

DETAILED DESCRIPTION

Referring first to FIGS. 1 to 4, there is shown a lens apparatus 1 to which the present invention is applied. The lens apparatus 1 includes a lens system 2, a first lens barrel 3A, a second lens barrel 3B, a CCD element (image pickup device) 4 and an image blur correction apparatus 5. The lens system 2 includes five lens groups including a plurality of lenses disposed on the same optical axis L. The first lens barrel 3A is a front lens barrel which supports the lenses of the lens system 2 in a fixed state or for movement thereon. The second lens barrel 3B is a rear lens barrel connected to the first lens barrel 3A. The CCD element (solid-state image pickup element) 4 is a particular example of an image pickup section disposed on the optical axis L of the lens system 2 and secured to the second lens barrel 3B. The image blur correction apparatus 5 is provided on the second lens barrel 3B to correct image blur of the lens system 2.

Figure 2:
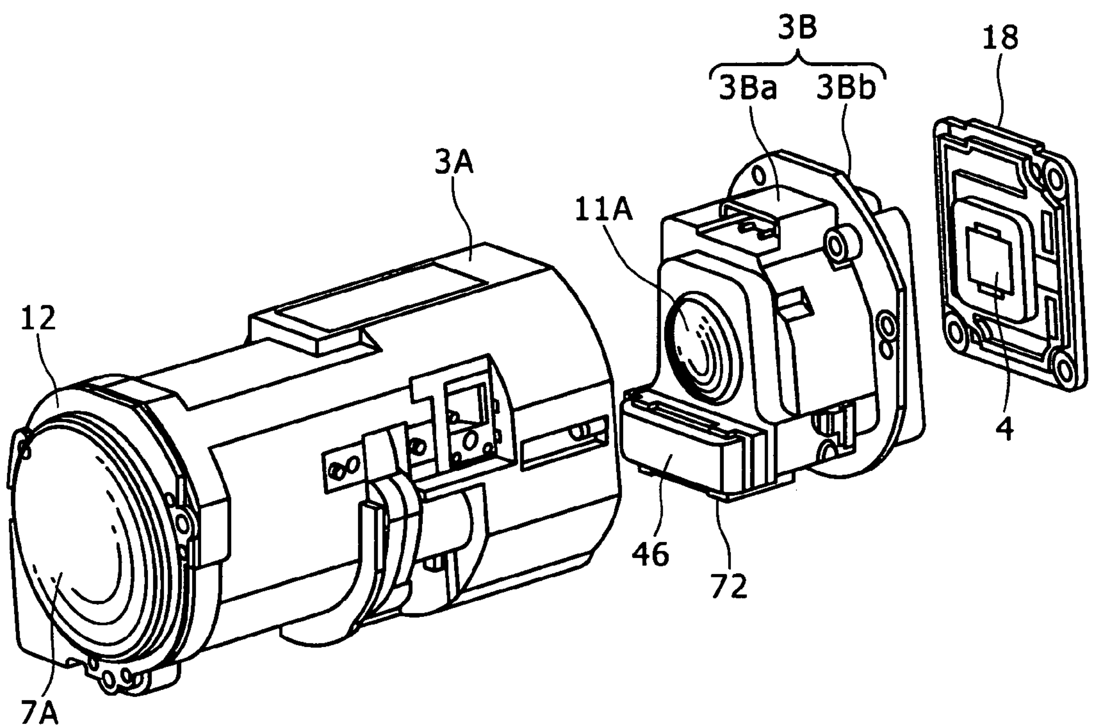
FIG. 2 is a perspective view of the lens apparatus of FIG. 1 in a state wherein the lens apparatus is disassembled into a first lens barrel, a second lens barrel and a CCD adapter.
Figure 4:
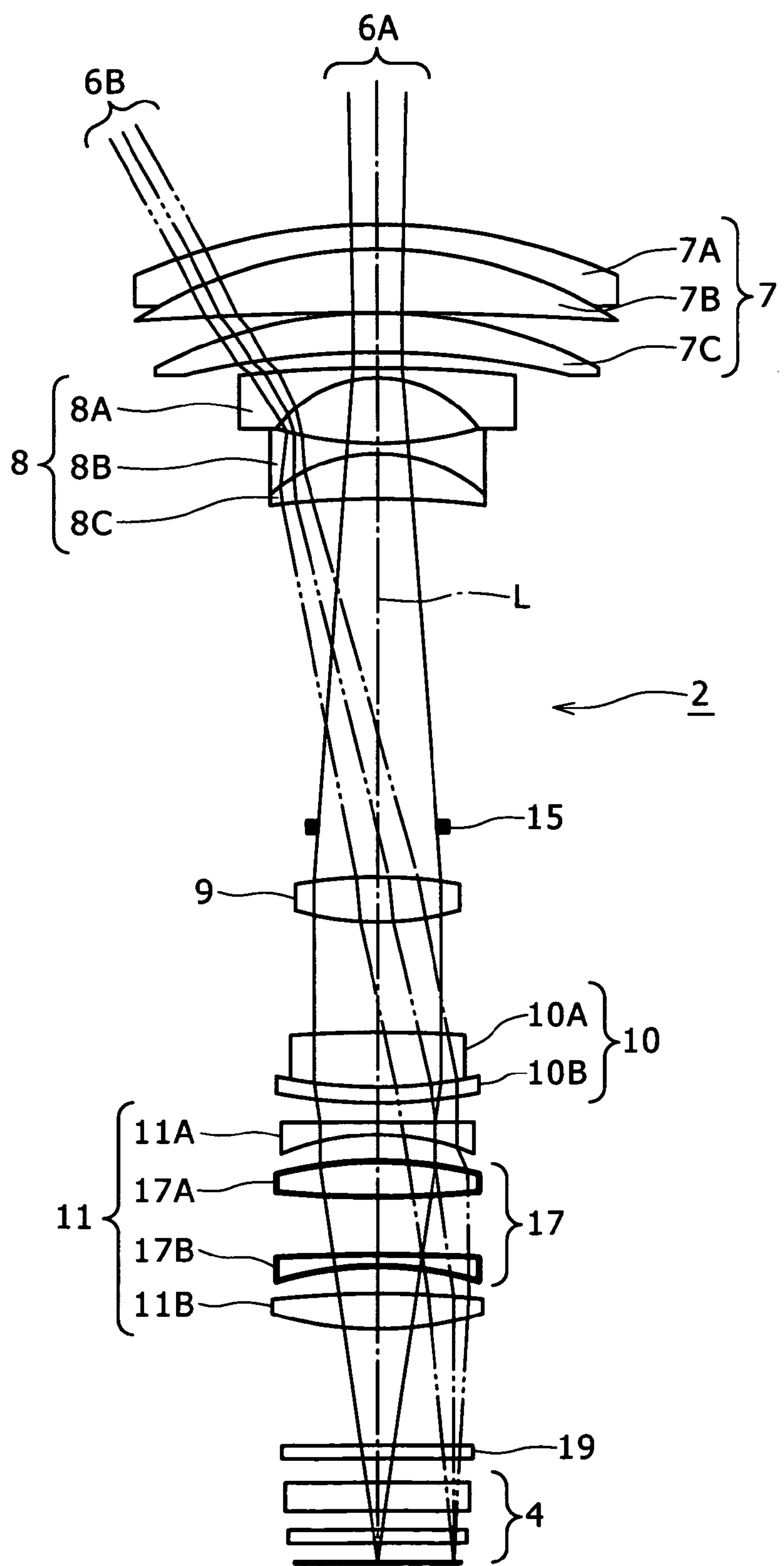
FIG. 4 is a schematic view showing the lens system of the lens apparatus of FIG. 1.
Figure 5:
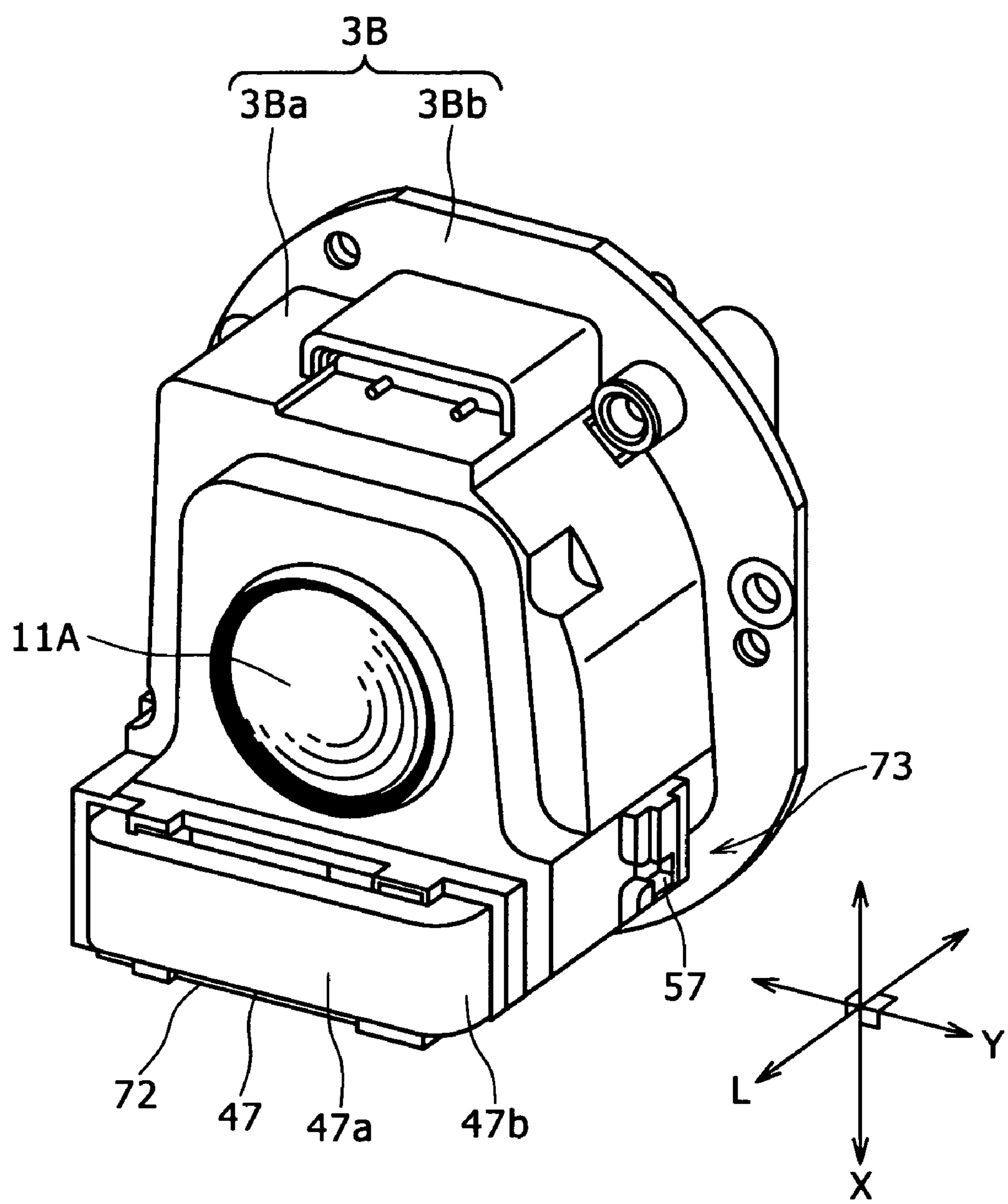
FIG. 5 is a perspective view showing the second lens barrel of the lens apparatus shown in FIG. 2 in an enlarged scale.

The lens system 2 of the lens apparatus 1 is formed as a combination lens including five lens groups 7 to 11 disposed on the same optical axis L as seen in FIGS. 2 and 4. From among the five lens groups 7 to 11, the first lens group 7 is positioned on the extremity side and includes a first lens 7A serving as an objective lens for being opposed to an image pickup subject, a second lens 7B adhered to a face of the first lens 7A remote from the image pickup subject, and a third lens 7C disposed on the further inner side. The first lens 7A and the third lens 7C are held by a first lens group holder 12. The second lens group 8 is disposed rearwardly of the first lens group 7 such that light transmitted through the first lens group 7 is introduced to the second lens group 8.

The second lens group 8 is a combination of a fourth lens 8A, a fifth lens 8B and a sixth lens 8C. The second lens group 8 is held by a second lens group holder 13. The second lens group holder 13 is mounted for movement in a direction of the optical axis L along the optical axis L. Light transmitted through the second lens group 8 passes through an iris shutter apparatus 15 and is introduced to the third lens group 9. The iris shutter apparatus 15 includes an iris mechanism capable of adjusting the amount of light to pass the lens system 2, and a shutter mechanism for opening or closing the optical path of the light.

The third lens group 9 includes a seventh lens secured to the first lens barrel 3A. The fourth lens group 10 is disposed rearwardly of the third lens group 9. The fourth lens group is a combination of an eighth lens 10A and a ninth lens 10B. The fourth lens group 10 is held by a fourth lens group holder 16. The fourth lens group holder 16 is mounted for movement in a direction of the optical axis L along the optical axis L. The fifth lens group 11 is disposed rearwardly of the fourth lens group 10.

The fifth lens group 11 includes a tenth lens 11A, an eleventh lens 11B, and a correction lens 17 which is in turn formed from a combination of a correction lens 17A and another correction lens 17B. The tenth lens 11A and the eleventh lens 11B of the fifth lens group 11 are held fixedly in a spaced relationship by a predetermined distance in the direction of the optical axis L on the second lens barrel 3B. The correction lens 17 (correction lens 17A and correction lens 17B) is interposed in a space set between the tenth lens 11A and the eleventh lens 11B such that the optical axis thereof can be brought into register with optical axis L of the lens system. The correction lens 17 is held fixedly on the image blur correction apparatus 5 hereinafter described. The correction lens 17 is movable in a direction perpendicular to the optical axis L of the lens system. The CCD element 4 is disposed rearwardly of the eleventh lens 11B of the fifth lens group 11.

The second lens group 8 and the fourth lens group 10 are mounted for movement independently of each other in a direction of the optical axis L along the optical axis L together with the second lens group holder 13 and the fourth lens group holder 16, respectively. Zooming adjustment and focusing adjustment can be performed by moving the second lens group 8 and the fourth lens group 10 in a predetermined direction. In particular, upon zooming, the second lens group holder 13 and the fourth lens group holder 16 can operate to move the second lens group 8 and the fourth lens group 10 from a wide angle side position to a telephoto side position to perform zooming adjustment. On the other hand, upon focusing, the fourth lens group holder 16 can operate to move the fourth lens group 10 from a wide angle side position to a telephoto side position to execute focusing adjustment.

The CCD element 4 is secured to a CCD element adapter 18 and attached to the second lens barrel 3B through the CCD element adapter 18. An optical filter 19 is disposed on the front side of the CCD element 4 and secured to the second lens barrel 3B. The image blur correction apparatus 5 which is hereinafter described in detail is provided to correct blur of a picked up image caused by vibrations or the like of the lens system 2. The correction lens 17 of the image blur correction apparatus 5 is provided such that the optical axis thereof is normally in register with the optical axis L of the lens system 2. Then, when image blur occurs on the image forming plane of the CCD element 4 because of vibrations or the like of the camera body, the image blur correction apparatus 5 moves the correction lens 17 in two directions (first direction X and second direction Y) perpendicular to the optical axis L to correct the image blur on the image forming plane.

As seen in FIG. 2 and so forth, the first lens barrel 3A which is a principal component of the lens barrel 3 is formed from a hollow tubular member in which the lens groups of the lens system 2 are accommodated. The first lens group holder 12 is secured to an end portion in the axial direction of the first lens barrel 3A. The second lens barrel 3B has a tubular body portion 3B*a* inserted in the hollow of the first lens barrel 3A, and a flange portion 3B*b* extending in a radially outward direction from an outer face of the body portion 3B*a*. The flange portion 3B*b* is secured by a plurality of fastening screws to removably attach the second lens barrel 3B to the first lens barrel 3A. The second lens group holder 13 and the fourth lens group holder 16 are supported for movement in a direction of the optical axis L of the lens system 2 in the first lens barrel 3A.

Now, the image blur correction apparatus 5 of the lens apparatus 1 is described. FIGS. 5 to 23 show the image blur correction apparatus 5 which includes a driving section of the moving coil type. Referring to FIGS. 5 to 23, the image blur correction apparatus 5 includes the second lens barrel 3B and the correction lens 17 described hereinabove and further includes a first movable frame 21, a second movable frame 22, an electric actuator 23 and so forth. The image blur correction apparatus 5 controls the correction lens 17 disposed coaxially with the optical axis L of the lens system 2 to move in the first direction x perpendicular to the optical axis L of the lens system 2 and the second direction Y perpendicular to the optical axis L of the lens system 2 and also to the first direction X in response to the magnitude and the direction of image blur by means of the electric actuator 23 thereby to correct the image blur so that an image free from any image blur is obtained.

Referring to FIGS. 5 to 20, the first movable frame 21 of the image blur correction apparatus 5 includes a cylindrical lens fixing portion 21*a*, and a coil fixing portion 21*b* provided integrally with the lens fixing portion 21*a*. The lens fixing portion 21*a* has a through-hole 24, in which the two correction lenses 17A and 17B are fixedly held in a spaced relationship from each other in the direction of the optical axis on the same optical axis. The coil fixing portion 21*b* is provided continuously on one side of the lens fixing portion 21*a*, and a first sliding bearing portion 26 is provided on one side of the lens fixing portion 21*a* in a direction (second direction Y) perpendicular to the direction (first direction X) in which the coil fixing portion 21*b* and the lens fixing portion 21*a* are connected. Meanwhile, a first rod engaging portion 27 is provided on the opposite side of the coil fixing portion 21*b*.

The first sliding bearing portion 26 is formed as an eaves-like portion having a first clearance groove 29 opened to the rear face side and extending in a longitudinal direction, and two bearing pieces 26*a* and 26*b* are provided at the opposite end portions of the first sliding bearing portion 26 in the longitudinal direction. A first main guide rod 28 is fitted for sliding movement in the two bearing pieces 26*a* and 26*b* and has the opposite end portions projecting to the outside individually through the bearing pieces 26*a* and 26*b*. Two semi-circular projections 29*a* are provided at different locations in the first clearance groove 29 and cooperate with the two bearing pieces 26*a* and 26*b* to form oil sumps 30. Grease as lubricant is filled and retained in the oil sumps 30.

The first rod engaging portion 27 is formed as a projection projecting sidewardly, and a rod engaging groove 27*a* is provided on the projection and open sidewardly. A first sub guide rod 31 is fitted for sliding movement in the rod engaging groove 27*a* of the first rod engaging portion 27. The first sub guide rod 31 prevents pivotal displacement of the first movable frame 21 around the first direction X.

The coil fixing portion 21*b* of the first movable frame 21 is formed from a shroud frame formed continuously to and sidewardly of the lens fixing portion 21*a*. In particular, the coil fixing portion 21*b* has an upper plate portion 32*a*, a side plate portion 32*b* and a lower plate portion 32*c*, which define a rectangular space sidewardly of the lens fixing portion 21*a*. A flat coil 33 which is a first particular example of the first coil and a tubular coil 34 which is a first particular example of the second coil are secured to the coil fixing portion 21*b* by fixing means such as a bonding agent.

The flat coil 33 includes two coil portions 33*a* and 33*b* in the form of a framework having a substantially rectangular shape. The two coil portions 33*a* and 33*b* have widthwise dimensions substantially equal to each other but have longitudinal dimensions different from each other. Further, the two coil portions 33*a* and 33*b* are formed by winding a single coil wire and have winding directions set such that, when they are energized, electric current flows in the same direction along propelling force generation portions 35*a* and 35*b* on the major side of the coil portions 33*a* and 33*b* which are adjacent each other in the widthwise direction and extend in parallel to each other. The two coil portions 33*a* and 33*b* having the configuration just described are carried on the top face of the tubular coil 34.

The tubular coil 34 is formed by winding a wire by a predetermined number of turns such that a rectangular space is provided at a central portion and the tubular coil 34 has a predetermined width in a direction of winding layers so that the tubular coil 34 is generally formed as a tubular member having a rectangular shape. The two coil portions 33*a* and 33*b* of the flat coil 33 are carried on a propelling force generation portion 36 which is a face on the major side of the tubular coil 34 and are integrally secured to the propelling force generation portion 36 by a bonding agent to form a coil assembly 37. In this instance, the two coil portions 33*a* and 33*b* of the flat coil 33 and the tubular coil 34 are disposed such that the propelling force generation portions 35*a* and 35*b* of the flat coil 33 and the propelling force generation portion 36 of the tubular coil 34 extend perpendicularly to each other.

The tubular coil 34 is secured at a face thereof opposite to the propelling force generation portion 36 to the lower plate portion 32*c* of the coil fixing portion 21*b* of the first movable frame 21 by a bonding agent so that the coil assembly 37 composed of the flat coil 33 and the tubular coil 34 is attached integrally to the first movable frame 21. In this instance, the direction in which the propelling force generation portions 35*a* and 35*b* of the two coil portions 33*a* and 33*b* of the flat coil 33 extend is set to the widthwise direction of the first movable frame 21, and the direction in which the propelling force generation portion 36 of the tubular coil 34 extends is set to the longitudinal direction of the first movable frame 21. The longitudinal direction of the first movable frame 21 is defined as the first direction X in the present embodiment while the widthwise direction of the first movable frame 21 is defined as the second direction Y in the present embodiment.

Figure 19:
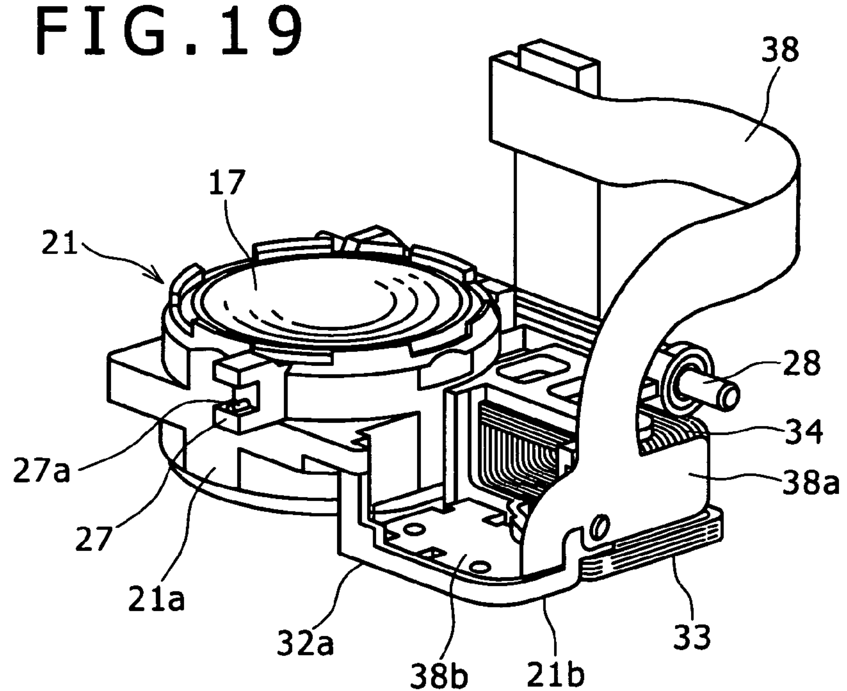
FIG. 19 is a perspective view of the first movable frame of the image blur correction apparatus of FIG. 8 as viewed from the front side.
Figure 20:
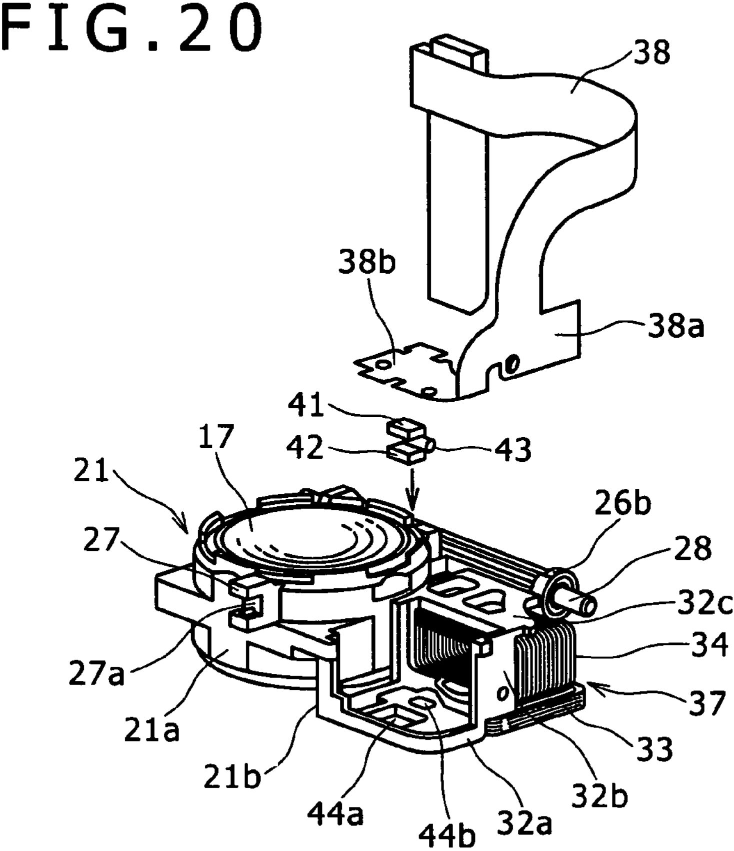
FIG. 20 is a perspective view of a flexible circuit board, two Hall elements and a thermistor of the image blur correction apparatus of FIG. 19 in a disassembled state.

The opposite ends of the flat coil 33 and the opposite ends of the tubular coil 34 are electrically connected to predetermined wiring line patterns provided on a flexible circuit board 38. Referring to FIGS. 19 and 20, the flexible circuit board 38 includes a coil connection portion 38*a* for electric connection to the flat coil 33 and the tubular coil 34, and a sensor connection portion 38*b* for electric connection to a position detection section hereinafter described and so forth. The coil connection portion 38*a* of the flexible circuit board 38 is disposed such that it covers an outer face of the side plate portion 32*b* of the coil fixing portion 21*b* of the first movable frame 21.

The sensor connection portion 38*b* of the flexible circuit board 38 is disposed such that it covers an inner face of the upper plate portion 32*a* in the coil fixing portion 21*b* of the first movable frame 21 from the inner side. Two Hall elements 41 and 42 and a thermistor 43 are mounted on the sensor connection portion 38*b*. The Hall elements 41 and 42 are a first particular example of a position detection section which detects the position of the correction lens 17 and outputs a detection signal. The thermistor 43 is a first particular example of a temperature detection section which detects an environmental temperature and outputs a detection signal. Wiring line patterns of a predetermined shape are provided on the sensor connection portion 38*b* and electrically connected to the Hall elements 41 and 42 and thermistor 43 so that detection signals from them can be transmitted by the wiring line patterns.

In a corresponding relationship, recesses 44*a* and 44*b* are provided on the inner face of the upper plate portion 32*a* such that the two Hall elements 41 and 42 and the thermistor 43 can be accommodated therein. The two Hall elements 41 and 42 and the thermistor 43 are accommodated in the recesses 44*a* and 44*b* such that the top faces thereof may be substantially in flush with the inner face of the upper plate portion 32*a*. Consequently, the top faces of the Hall elements 41 and 42 and the thermistor 43 are prevented from projecting by a great amount into the space of the coil fixing portion 21*b* thereby to prevent the yoke from slidably contacting with the Hall elements 41 and 42 or the thermistor 43.

The first Hall element 41 and the second Hall element 42 which are first and second position sensors detect the position of a magnet 45 described below and individually output detection signals corresponding to a relative positional relationship between the magnet 45 and the first movable frame 21. In particular, the first Hall element 41 and the second Hall element 42 detect the strength of magnetic force from the magnet 45, which moves relative to the first Hall element 41 and the second Hall element 42, at a predetermined position of the first movable frame 21 and output detection signals corresponding to the strengths of the magnetic force. A control apparatus hereinafter described arithmetically operates the position of the correction lens 17 held on the first movable frame 21 based on the detection signals from the Hall elements 41 and 42 and outputs a control signal based on a result of the arithmetic operation.

The thermistor 43 detects the environmental temperature around the two Hall elements 41 and 42 so that, when the environmental temperature rises higher than a predetermined value, temperature correction is applied to image blur correction against a camera shake, vibrations or the like. The thermistor 43 is disposed at a position spaced by a substantially equal distance from the two Hall elements 41 and 42 and outputs a detection signal corresponding to the environmental temperature of the Hall elements 41 and 42. The control apparatus hereinafter described executes arithmetic operation for further correcting the correction value calculated based on the detection signals from the two Hall elements 41 and 42 based on the detection signal from the thermistor 43 to calculate a final correction value. Then, the thermistor 43 outputs a control signal based on a result of the arithmetic operation.

The magnet 45 which applies magnetic force to the two Hall elements 41 and 42 in the present embodiment is formed as a rectangular plate member having a suitable thickness. The magnet 45 is secured to a yoke 46 made of a magnetic material and cooperates with the yoke 46 to form a magnetic circuit. The magnet 45 is removably attached to the second lens barrel 3B through the yoke 46.

The yoke 46 includes a main yoke 47 to which the magnet 45 is secured, and a back yoke 48 connected to the main yoke 47 to form an annular magnetic circuit. The main yoke 47 is formed in a channel shape and has a middle piece 47*a* positioned centrally, and two side pieces 47*b* connected to the opposite sides in the longitudinal direction of the middle piece 47*a*. The magnet 45 is integrally secured to the inner side of the middle piece 47*a* of the main yoke 47 by a bonding agent such that the longitudinal directions of the middle piece 47*a* and the magnet 45 coincide with each other. The side pieces 47*b* on the opposite sides of the main yoke 47 have engaging pieces 47*c* provided thereon for engaging with the back yoke 48.

The back yoke 48 of the yoke 46 is formed from a bar-like member extending straightforwardly. The back yoke 48 has cutaway portions 48*a* provided at the opposite ends in the longitudinal direction thereof such that, when the back yoke 48 is assembled to the second lens barrel 3B, the cutaway portions 48*a* individually engage with the engaging pieces 47*c* provided on the side pieces 47*b* of the main yoke 47. The back yoke 48 is fitted in the space of the tubular coil 34 of the coil assembly secured to the first movable frame 21. While the back yoke 48 is in the fitted state, the first movable frame 21 is assembled to the second lens barrel 3B. Thereafter, the main yoke 47 is assembled to the second lens barrel 3B, whereupon the main yoke 47 is engaged with the back yoke 48 so that the first movable frame 21 is prevented from coming off the second lens barrel 3B.

Figure 22:
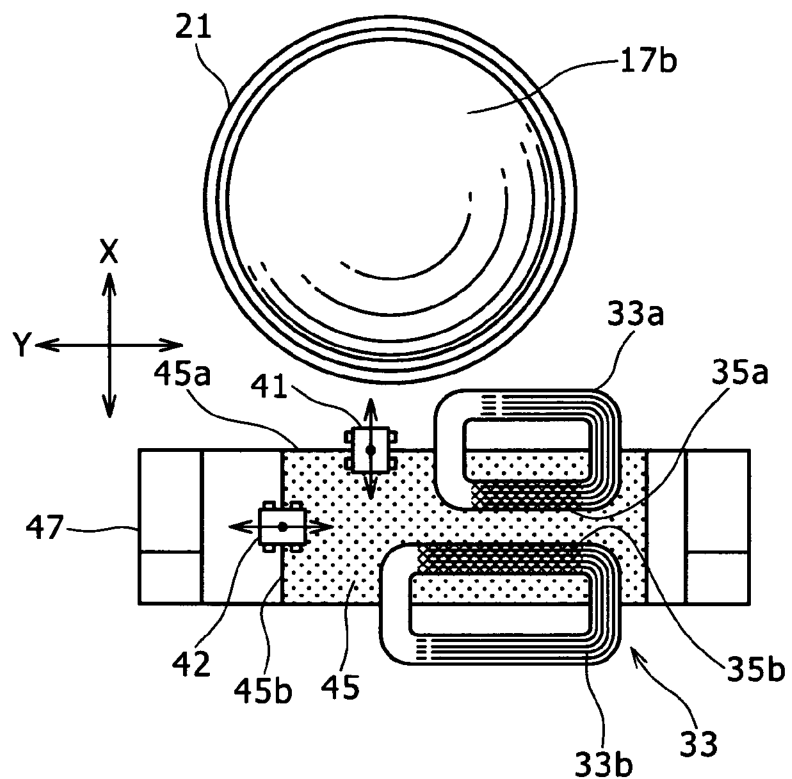
FIG. 22 is a schematic view illustrating a positional relationship of a magnet and the two Hall elements of the image blur correction apparatus of FIG. 8.
Figure 23:
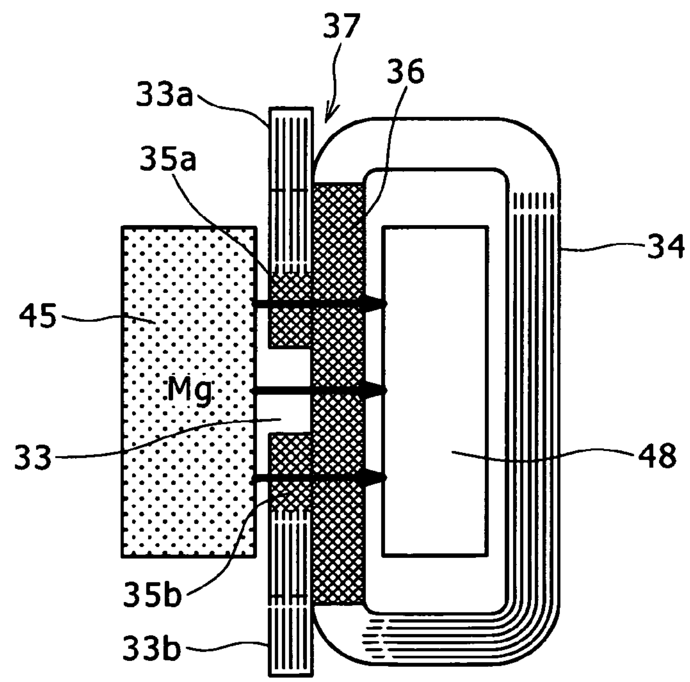
FIG. 23 is a schematic view illustrating a positional relationship of the magnet, two coils and a yoke of the image blur correction apparatus of FIG. 8.

In this instance, the magnet 45 secured to the main yoke 47 is disposed such that the two minor sides thereof extend in the first direction X and the major sides thereof extend in the second direction Y as seen in FIG. 22. In this arrangement state, if current is supplied to the flat coil 33, then magnetic force of the magnetic circuit formed from the magnet 45 and the yoke 46 (main yoke 47 and back yoke 48) acts in a direction perpendicular to the direction in which the propelling force generation portions 35*a* and 35*b* of the coil portions 33*a* and 33*b* extend. Therefore, propelling force in the first direction X is generated (acts) in accordance with the Fleming's left-hand rule by the propelling force generation portions 35*a* and 35*b* of the two coil portions 33*a* and 33*b*.

Further, if current is supplied to the tubular coil 34 in the arrangement state described above, then the magnetic force of the magnetic circuit formed from the magnet 45 and the yoke 46 similarly acts but in a direction perpendicular to the direction in which the propelling force generation portion 36 of the tubular coil 34 extends. Therefore, propelling force in the second direction Y is generated (acts) in accordance with the Fleming's left-hand rule by the propelling force generation portion 36 of the tubular coil 34.

While the magnet 45 is disposed in such a manner as described above, the first Hall element 41 is disposed such that a substantially middle portion of the magnetic force detection section thereof is positioned on a first longer side 45*a* of the magnet 45 which is one of the major sides extending in the second direction Y but is displaced to one side (in the embodiment, to the left side in FIG. 24) from a central portion of the first longer side 45*a*. In this instance, when the first Hall element 41 and the magnet 45 move relative to each other in the first direction X in FIG. 24, the magnetic flux density of magnetic force detected by the first Hall element 41 generally exhibits such an arcuate first characteristic SP1 as indicated by a solid line at A1 of FIG. 24.

The first characteristic SP1 is given as a curve of a comparatively small radius of curvature corresponding to the length of the minor sides of the magnet 45. The first characteristic SP1 exhibits the highest magnetic flux density at a substantially middle portion in the widthwise direction which coincides with the first direction X. The first characteristic SP1 exhibits a peak value at a substantially central portion of the magnetic flux density distribution in the widthwise direction. And, the magnetic flux density of magnetic force detected by the first Hall element 41 decreases so as to describe a parabola to the opposite outer sides (toward the upper and lower major sides) from the substantially central portion.

In this instance, where the magnetic flux density at the position at which the central portion of the first Hall element 41 coincides with the first longer side 45*a* is represented by a1, if the first Hall element 41 moves from the point of the magnetic flux density al in a direction in which it is spaced away from the magnet 45 (in an upward direction on the plane of FIG. 24), then the magnetic flux density detected then further decreases to a magnetic flux density a0. On the other hand, if the first Hall element 41 moves in a direction in which it enters the inner side of the magnet 45 (in a downward direction on the plane of FIG. 24), the magnetic flux density detected then increases from the magnetic flux density al to another magnetic flux density a2.

The second Hall element 42 which serves as a second position sensor is disposed such that a substantially central portion of the magnetic force detection section thereof substantially coincides with a substantially central portion of a first shorter side 45*b* which is one of the minor sides of the magnet 45 which extend in the first direction X. In this instance, when the second Hall element 42 and the magnet 45 move relative to each other in the second direction Y in FIG. 24, the magnetic flux density of magnetic force detected by the second Hall element 42 generally exhibits such an arcuate second characteristic SP2 as indicated by a solid line at B1 in FIG. 24.

The second characteristic SP2 forms a curve having a comparatively large radius of curvature corresponding to the length of the major sides of the magnet 45. The second characteristic SP2 exhibits the highest magnetic flux density at a substantially central portion of the magnet 45 in the longitudinal direction which coincides with the second direction Y. The second characteristic SP2 exhibits a peak value at a substantially central portion of the magnetic flux density distribution in the widthwise direction. And, the magnetic flux density of magnetic force detected by the second Hall element 42 decreases so as to describe a parabola, which is more moderate than that of the first characteristic SP1, to the opposite outer sides in the longitudinal direction (toward the left and right minor sides) from the substantially central portion.

At this time, where the magnetic flux density at the position at which the central portion of the second Hall element 42 coincides with the first shorter side 45*b* is represented by b1, if the second Hall element 42 moves from the point of a magnetic flux density b1 in a direction in which it is spaced away from the magnet 45 (in a leftward direction on the plane of FIG. 24), then the magnetic flux density detected then further decreases to another magnetic flux density b0. On the other hand, if the second Hall element 42 moves in a direction in which it enters the inner side of the magnet 45 (in a rightward direction on the plane of FIG. 24), the magnetic flux density detected then increases from the magnetic flux density b1 to another magnetic flux density b2.

Meanwhile, where the first Hall element 41 and the magnet 45 move relative to each other in the first direction X, the second Hall element 42 moves in the first direction X along the first shorter side 45*b*. Therefore, the magnetic flux density of magnetic force detected by the second Hall element 42 does not apparently exhibit any variation, and the magnetic flux density b1 is detected as a fixed value. Similarly, where the second Hall element 42 and the magnet 45 move relative to each other in the second direction Y, the first Hall element 41 moves in the second direction Y along the first longer side 45*a*. Therefore, the magnetic flux density of magnetic force detected by the first Hall element 41 does not apparently exhibit any variation, and the magnetic flux density al is detected as a fixed value.

Accordingly, the direction of relative movement between the first and second Hall elements 41 and 42 and the magnet 45 and the amount of the movement can be detected by checking increase or decrease of the output (detection value) of the first Hall element 41 (whether the output increases or decreases) and increase or decrease of the output (detection value) of the second Hall element 42.

Figure 24:
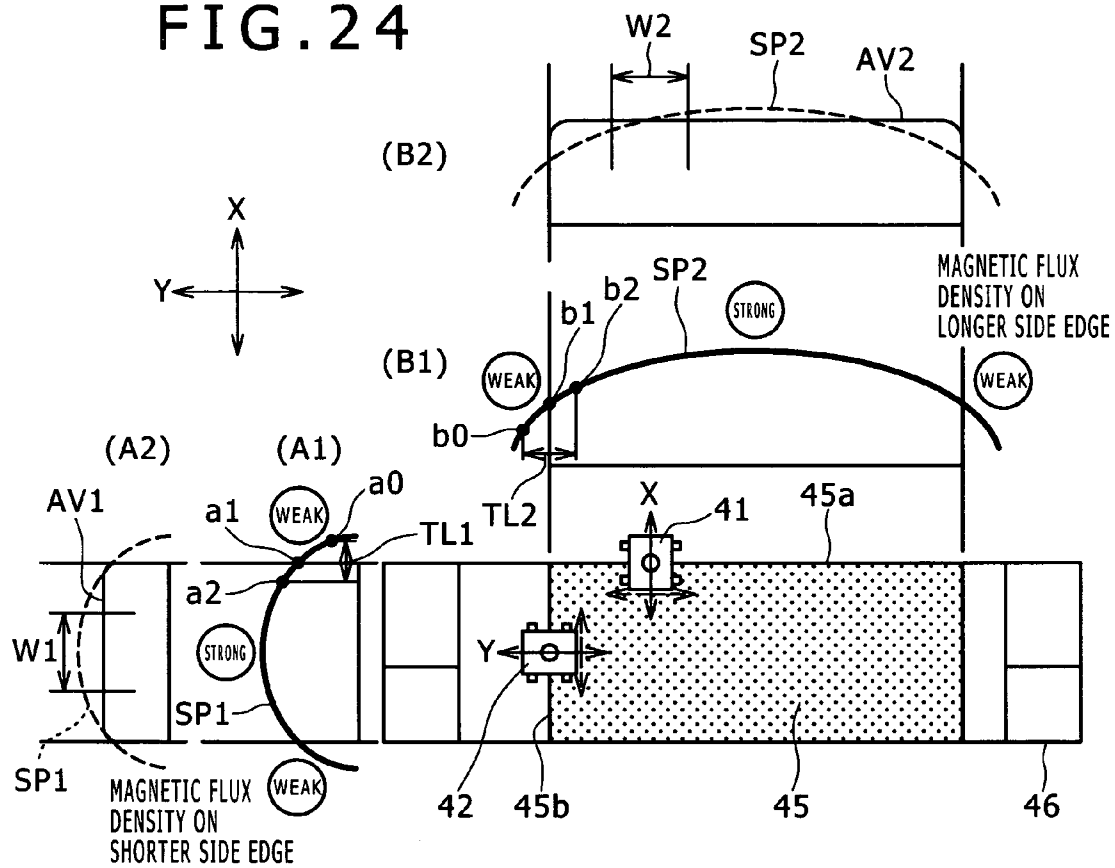
FIG. 24 is a schematic view illustrating a relationship of arrangement of the magnet and the two Hall elements of the image blur correction apparatus of FIG. 8 and the magnetic flux density detected in the arrangement.

If it is assumed that the two Hall elements 41 and 42 move in the upward direction which is one of the opposite directions of the first direction X in FIG. 24, then since the first Hall element 41 moves in the direction in which it is spaced away from the magnet 45 relative to the magnet 45, the output of the first Hall element 41 decreases. At this time, since the second Hall element 42 moves along the first shorter side 45*b*, the output of the second Hall element 42 does not exhibit any variation. On the other hand, if it is assumed that the two Hall elements 41 and 42 move in the downward direction which is the other one of the opposite directions of the first direction X, then since the first Hall element 41 moves in a direction in which it enters the inner side of the magnet 45, the output of the first Hall element 41 increases. At this time, since the second Hall element 42 moves along the first shorter side 45*b*, the output thereof does not exhibit any variation.

Similarly, if it is assumed that the two Hall elements 41 and 42 move in the leftward direction which is one of the opposite directions of the second direction Y in FIG. 24 relative to the magnet 45, then since the second Hall element 42 moves in a direction in which it is spaced away from the magnet 45 relative to the magnet 45, the output of the second Hall element 42 decreases. In this instance, since the first Hall element 41 moves along the first longer side 45*a*, the output of the first Hall element 41 does not exhibit any variation. On the other hand, if it is assumed that the two Hall elements 41 and 42 move in the rightward direction which is the other one of the opposite directions of the second direction Y, then since the second Hall element 42 moves in a direction in which it enters the inner side of the magnet 45, the output of the second Hall element 42 increases. At this time, since the first Hall element 41 moves along the first longer side 45*a*, the output thereof does not exhibit any variation.

Table 1 given below indicates the relative positional relationship of the magnet 45 and the two Hall elements 41 and 42 and the outputs of the Hall elements 41 and 42. As can be apparently seen from Table 1, the direction of relative movement between the magnet 45 and the two Hall elements 41 and 42 can be detected by checking the variation of the outputs (magnetic flux densities) of the two Hall elements 41 and 42. Then, if the amounts of variation of the magnetic flux density upon the movement are checked, then the amounts of movement (amounts of variation) in the first direction X and the second direction Y can be detected based on the magnetic flux densities upon such detection.

TABLE 1

| Direction of relative movement of first and second Hall elements 41, 42 to magnet 45 | Output of first Hall element 41 | Output of second Hall element 42 |
|---|---|---|
| Upward direction of first direction X | Decrease | Not vary |
| Downward direction of first direction X | Increase | Not vary |
| Leftward direction of second direction Y | Not vary | Decrease |
| Rightward direction of second direction Y | Not vary | Increase |

The foregoing description is given under the assumption that, when the first Hall element 41 moves in the second direction Y along the first longer side 45*a* of the magnet 45 and when the second Hall element 42 moves in the first direction x along the first shorter side 45*b* of the magnet 45, generally the output of the first Hall element 41 or the second Hall element 42 does not exhibit any variation (the variation of the magnetic flux density is ignored). Actually, however, the magnetic flux density may exhibit such variation along the first longer side 45*a* and the first shorter side 45*b* that an influence of the variation cannot be ignored. In such an instance, it is preferable to uniformize the magnetic flux density of the first longer side 45*a* and the first shorter side 45*b* of the magnet 45 or take a countermeasure to eliminate the influence of the variation of the magnetic flux density.

Figure 25:
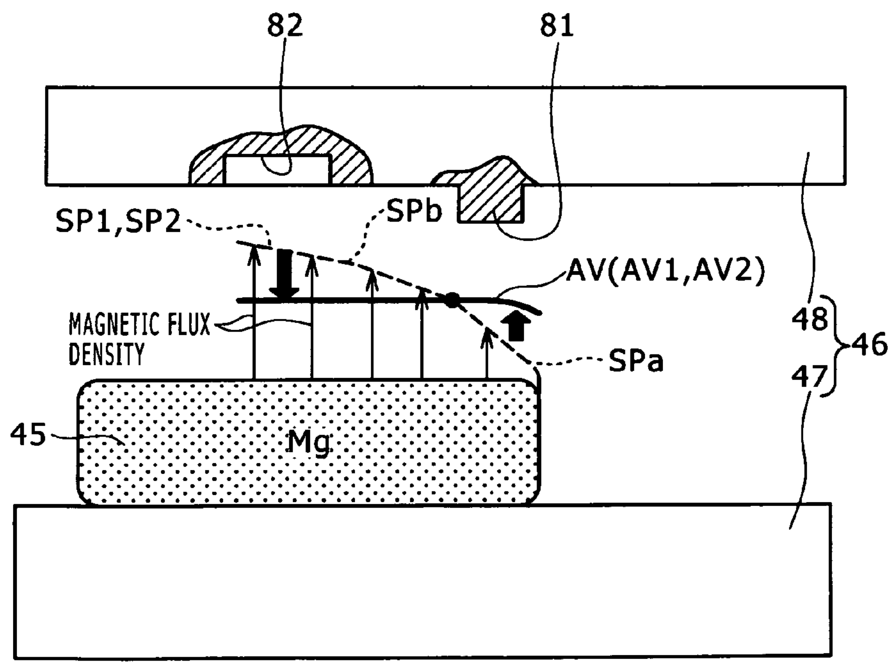
FIG. 25 is a schematic view illustrating a countermeasure for correcting the magnetic flux density by the magnet of the image blur correction apparatus of FIG. 8.

FIGS. 25 to 29 illustrate particular examples of the uniformization countermeasure of the magnetic flux density along the major sides and the minor sides of the magnet 45. FIG. 25 illustrates a principle of uniformization of the magnetic flux density along major sides and minor sides of the magnet 45. Referring to FIG. 25, in order to increase the magnetic flux density from the magnet 45, a projection 81 which is a first particular example of the magnetic force uniformization countermeasure is provided at an opposing portion of the back yoke 48 to the location at which the magnetic flux density is to be increased such that the distance between the yoke and the magnet 45 may be decreased by the projection 81. On the other hand, in order to decrease the magnetic flux density from the magnet 45, a recess 82 which is a second particular example of the magnetic force uniformization countermeasure is provided at an opposing portion of the back yoke 48 to the location at which the magnetic flux density is to be decreased such that the distance between the yoke and the magnet 45 may be increased by the recess 82.

Figure 26:
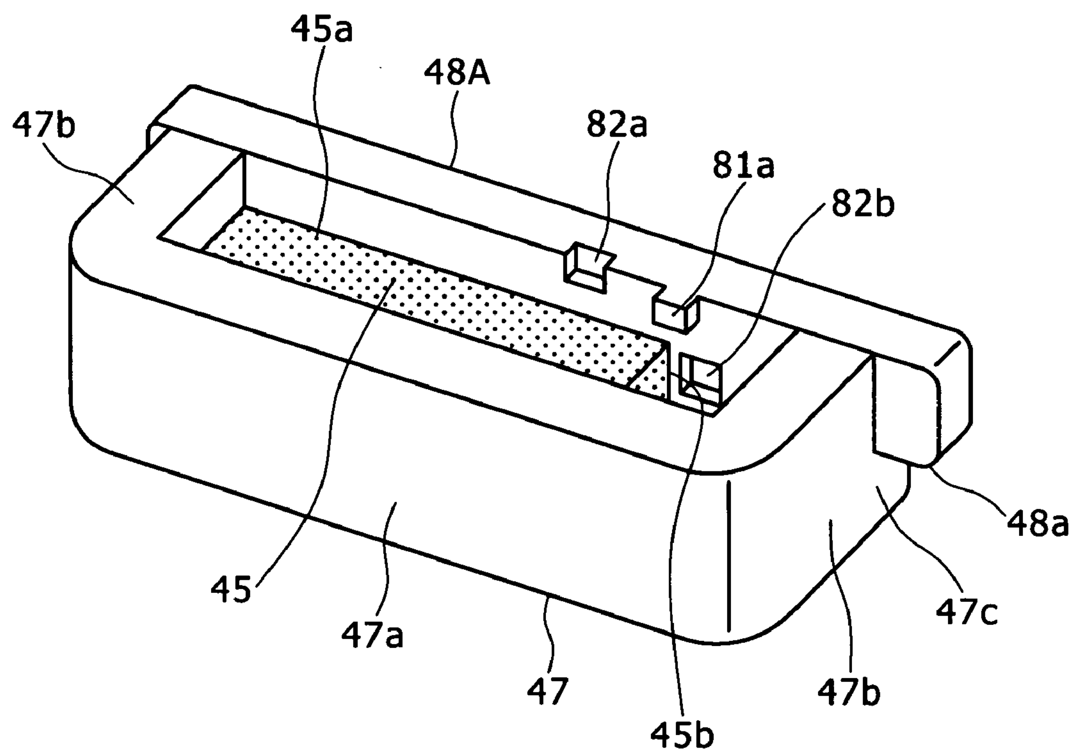
FIG. 26 is a perspective view showing another form of the electric actuator of the image blur correction apparatus of FIG. 8.
Figure 27:
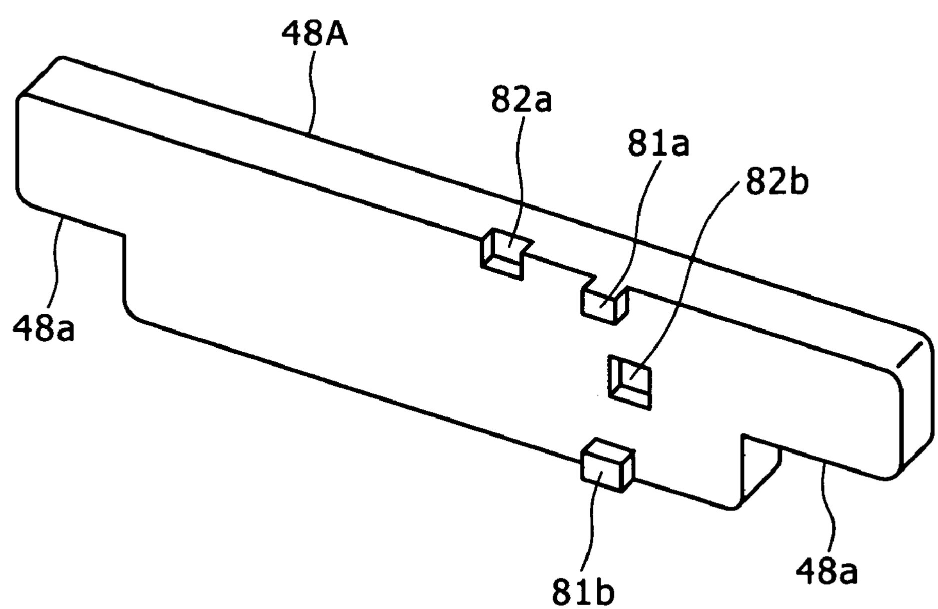
FIG. 27 is a perspective view of a back yoke of a yoke shown in FIG. 26.
Figure 28A:
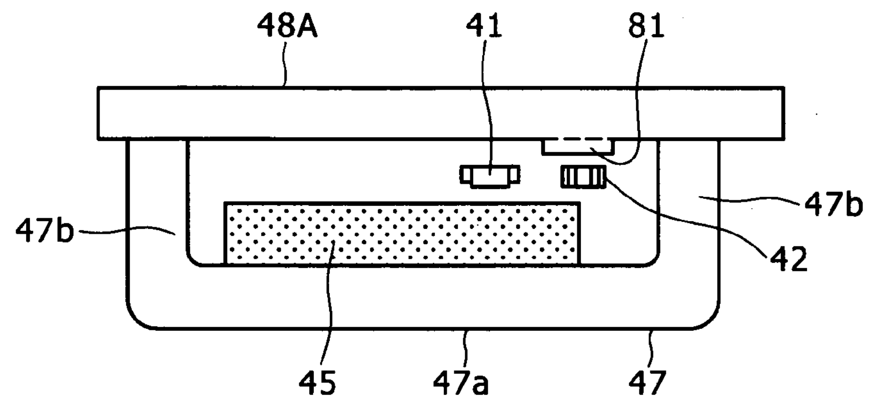
FIG. 28A is a plan view showing a projection of the electric actuator of FIG. 26
Figure 28B:
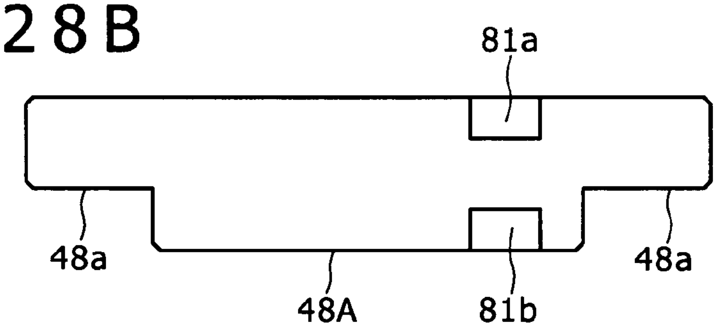
FIG. 28B is a front elevational view showing a projection of the back yoke of the electric actuator of FIG. 26.
Figure 29A:
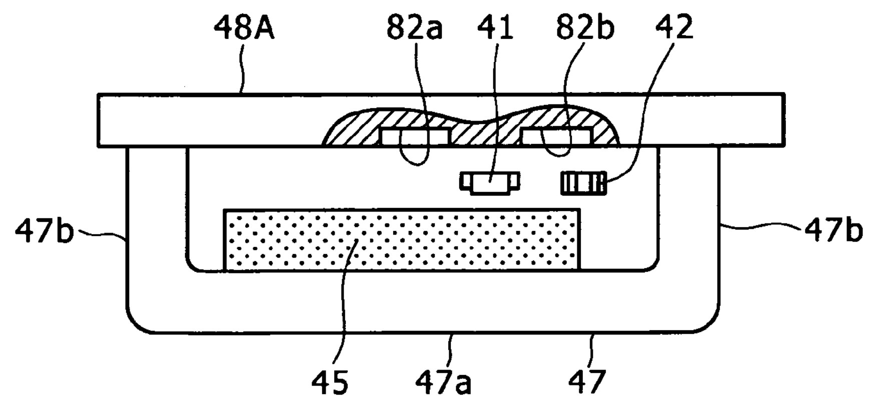
FIG. 29A is a plan view partly in section showing a recessed portion of the electric actuator of FIG. 26
Figure 29B:
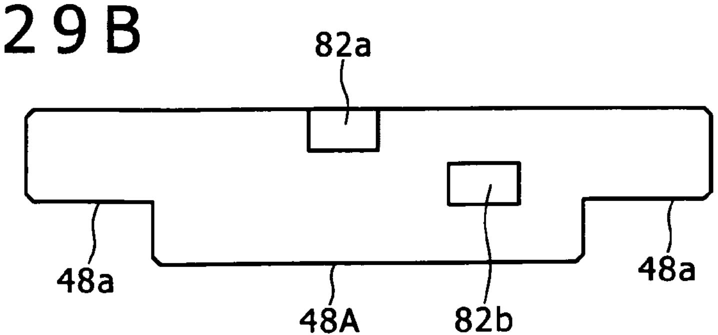
FIG. 29B is a front elevational view showing a recessed portion of the back yoke of the electric actuator of FIG. 26.

While the projection 81 and the recess 82 in FIGS. 26 and 27 have a rectangular shape, they may have some other shape such as a circular shape, an elliptic shape or a polygonal shape or may have any shape only if the magnetic flux density in a requisite fixed region can be uniformized. Further, the height of the projection 81 and the depth of the recess 82 are selected and set suitably in accordance with the magnitude of the magnetic flux density to be varied. Further, a coating which can promote or suppress transmission of magnetic force therethrough and adjust the transmission amount of the magnetic force or a seal member or the like having an adjustment layer formed from a material which can promote or suppress transmission of magnetic force therethrough or having such a material as just mentioned applied thereto may be used as another example of the magnetic force uniformization countermeasure.

Where the projection 81 is provided on the back yoke 48 as seen in FIG. 25, the magnetic flux density curve (SP1 or SP2) at an initial stage indicated by a broken line can be modified such that the magnetic flux density at a low magnetic flux density portion SPa thereof is increased to raise the magnetic flux density curve to a substantially averaged average magnetic flux density curve AV (AV1 or AV2). On the other hand, where the recess 82 is provided on the back yoke 48, the magnetic flux density curve (SP1 or SP2) at an initial stage indicated by a broken line can be modified such that the magnetic flux density at a high magnetic flux density portion SPb thereof is decreased to lower the magnetic flux density curve to the substantially averaged average magnetic flux density curve AV (AV1 or AV2).

FIGS. 26 to 29 shows examples wherein two projections 81*a* and 81*b* and two recesses 82*a* and 82*b* are provided on the back yoke 48A which is one of the components of the yoke 46 described hereinabove. The two projections 81*a* and 81*b* are provided in an opposing relationship to the opposite ends of the first shorter side 45*b* of the magnet 45 of the back yoke 48A which is secured to the main yoke 47. Further, the two projections 81*a* and 81*b* are disposed at positions symmetrical to each other on the opposite sides in the widthwise direction of the back yoke 48A such that a line interconnecting substantially central portions of the two projections 81*a* and 81*b* substantially coincides with the first shorter side 45*b*.

Meanwhile, of the two recesses 82*a* and 82*b*, the first recess 82*a* is provided at a position of the back yoke 48A opposing to the first longer side 45*a* of the magnet 45 secured to the main yoke 47 and spaced by a predetermined distance from the first projection 81*a*. Meanwhile, the second recess 82*b* is provided at a position of the back yoke 48A opposing to the first shorter side 45*b* of the magnet 45 secured to the main yoke 47 and substantially centrally between the two projections 81*a* and 81*b*.

Where the two projections 81*a* and 81*b* are disposed at the respective predetermined positions of the back yoke 48A in this manner, the curved characteristic SP1 of the magnetic flux density on the first shorter side 45*b* described hereinabove can be corrected so as to have substantially uniformized linearity as seen at A2 of FIG. 24. Consequently, the detection value of the second Hall element 42 which moves along the first shorter side 45*b* can be detected as substantially uniform values within a suitable measurement region W1. As a result, the variation of the magnetic flux density measured by the second Hall element 42 can be eliminated, and the decision of the directionality regarding such relative movement as described above and the distance of movement in the first direction X can be executed.

Similarly, where the two recesses 82*a* and 82*b* are disposed at predetermined positions of the back yoke 48A, the curved characteristic SP2 of the magnetic flux density on the first longer side 45*a* described hereinabove can be corrected so as to have substantially uniformized linearity as seen at B2 of FIG. 24. Consequently, the detection value of the first Hall element 41 which moves along the first longer side 45*a* can be detected as substantially uniform values within a suitable measurement region W2. As a result, the variation of the magnetic flux density measured by the first Hall element 41 can be eliminated, and the decision of the directionality regarding such relative movement as described above and the distance of movement in the second direction Y can be executed.

Figure 9:
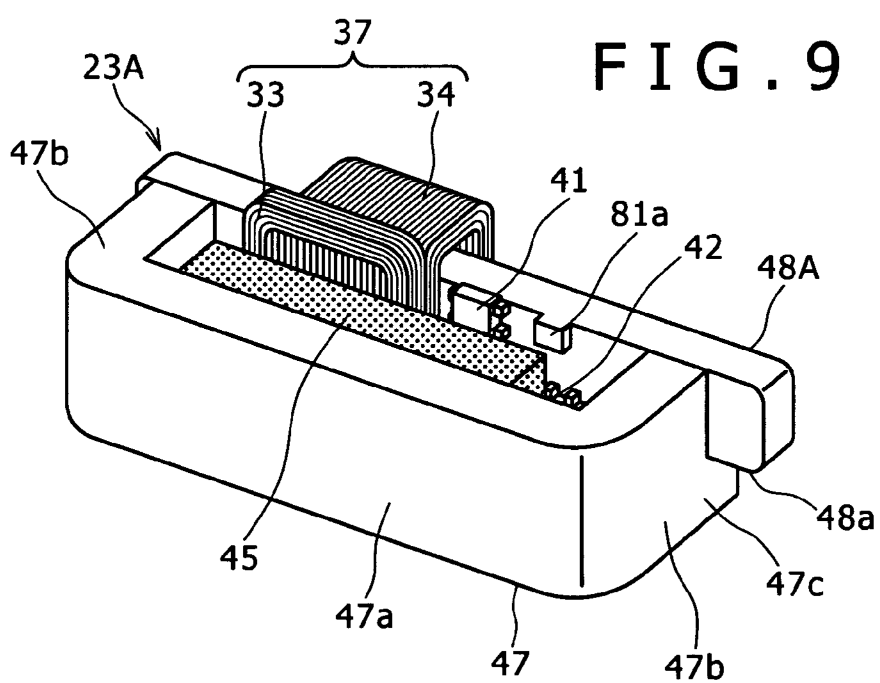
FIG. 9 is a perspective view showing another form of an electric actuator of the image blur correction apparatus of FIG. 8.
Figure 10:
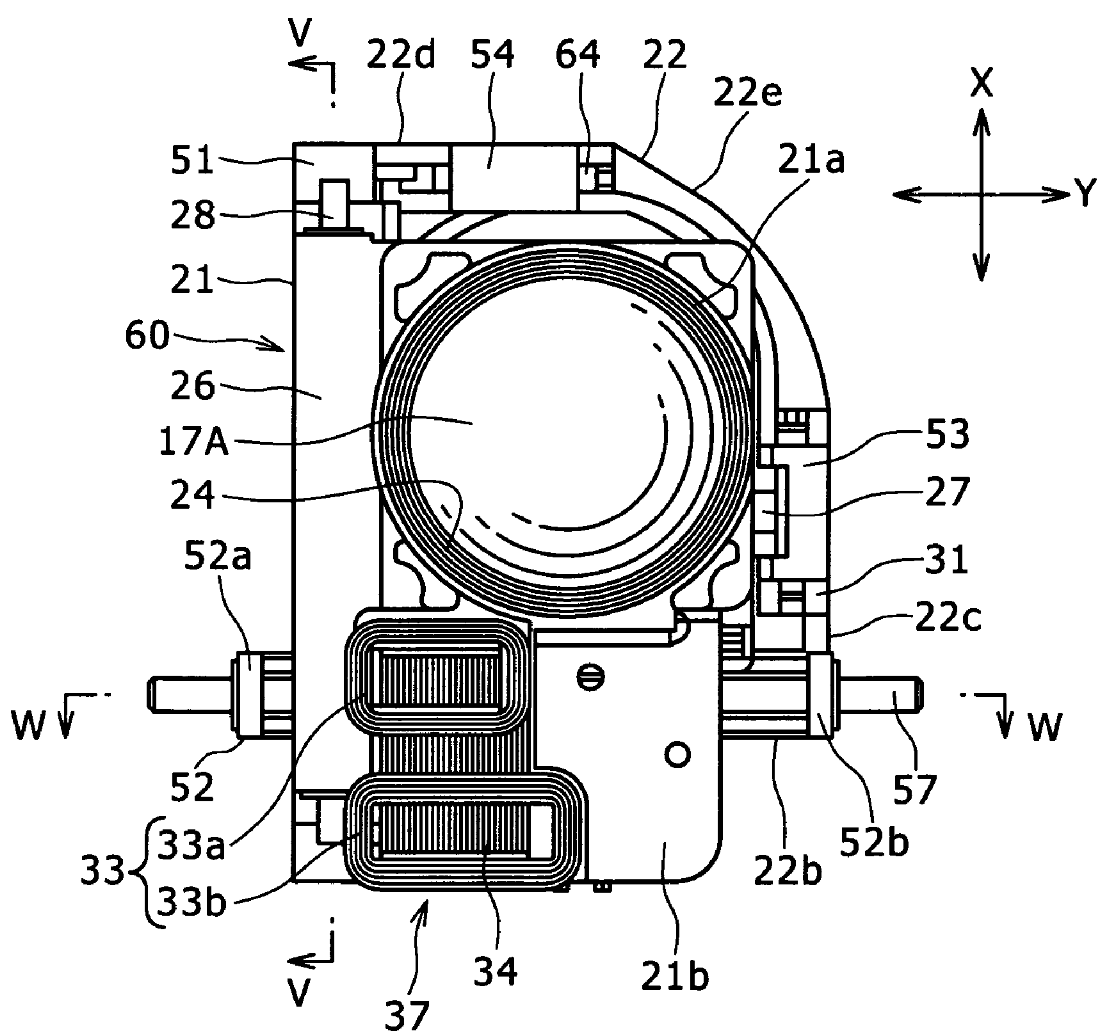
FIG. 10 is a front elevational view of the image blur correction apparatus of FIG. 8.
Figure 11:
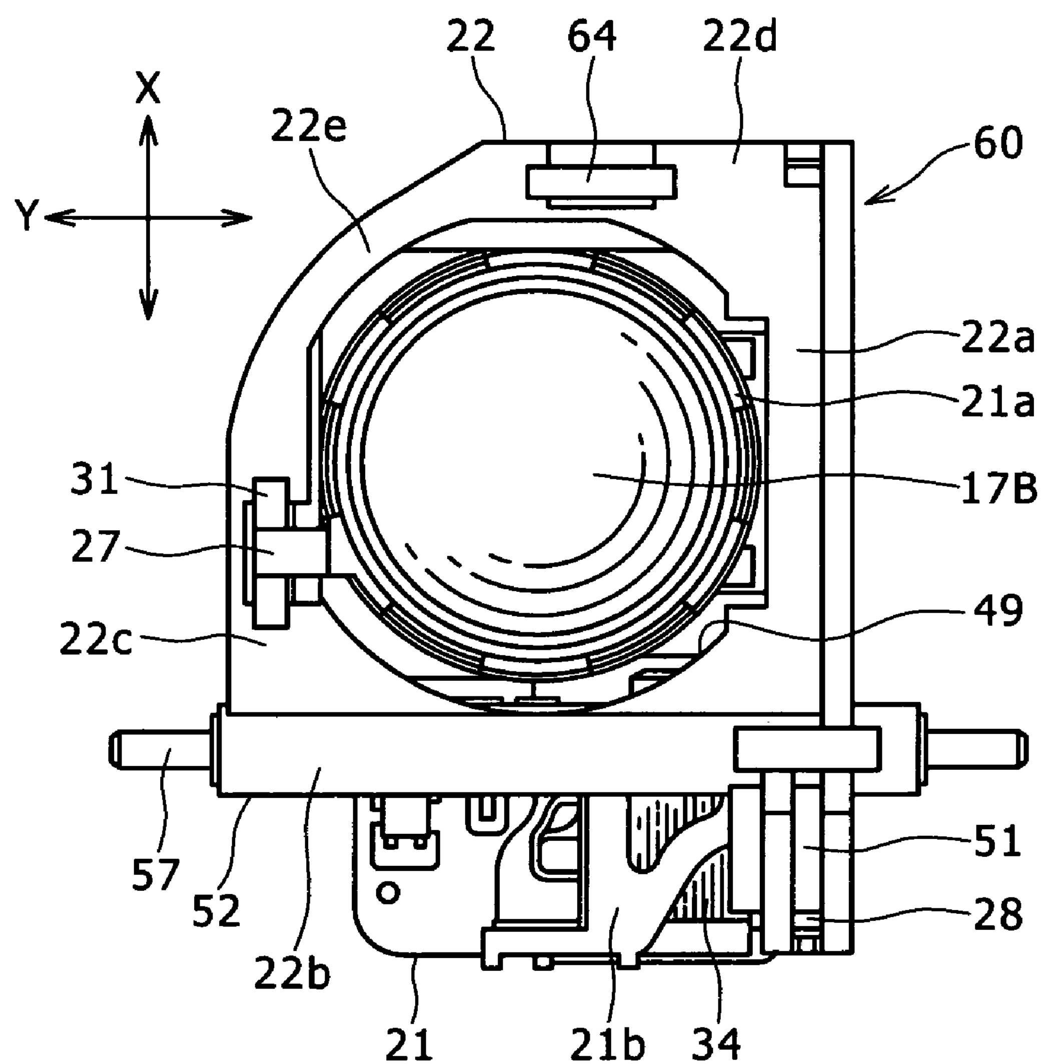
FIG. 11 is a rear elevational view of the image blur correction apparatus of FIG. 8.
Figure 12:
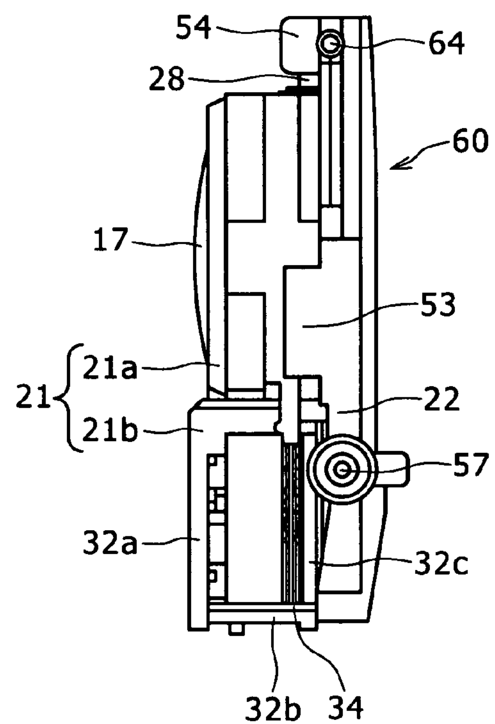
FIG. 12 is a left side elevational view of the image blur correction apparatus of FIG. 8.
Figure 13:
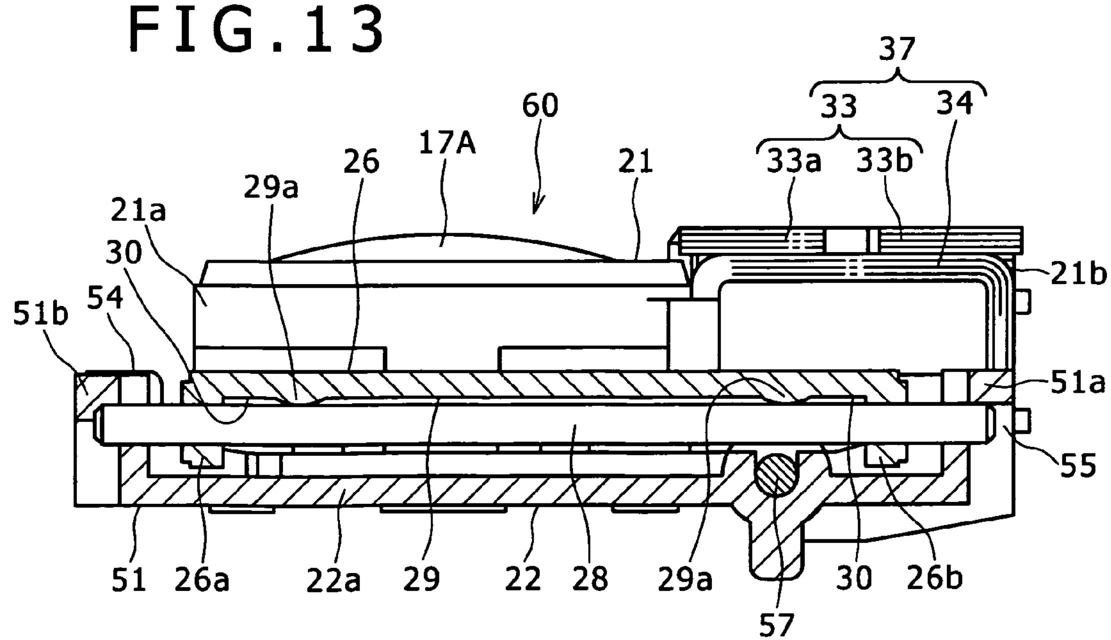
FIG. 13 is an enlarged sectional view taken along line V-V of FIG. 10.
Figure 14:
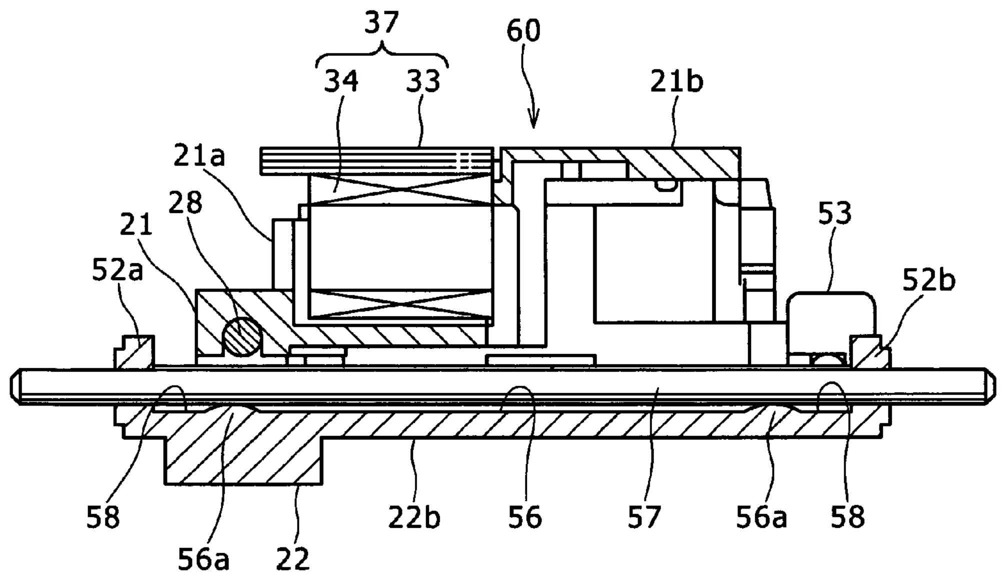
FIG. 14 is an enlarged sectional view taken along line W-W of FIG. 10.
Figure 15:
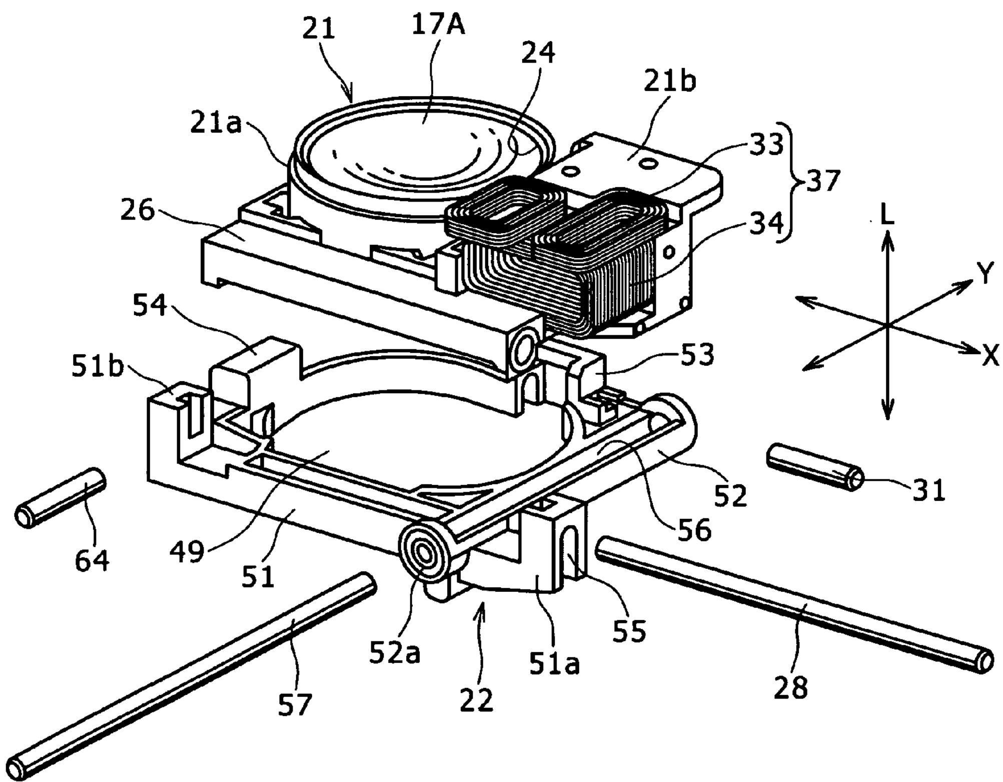
FIG. 15 is a perspective view showing a first movable frame and a second movable frame of the image blur correction apparatus of FIG. 8 in a disassembled state as viewed from the front side.
Figure 16:
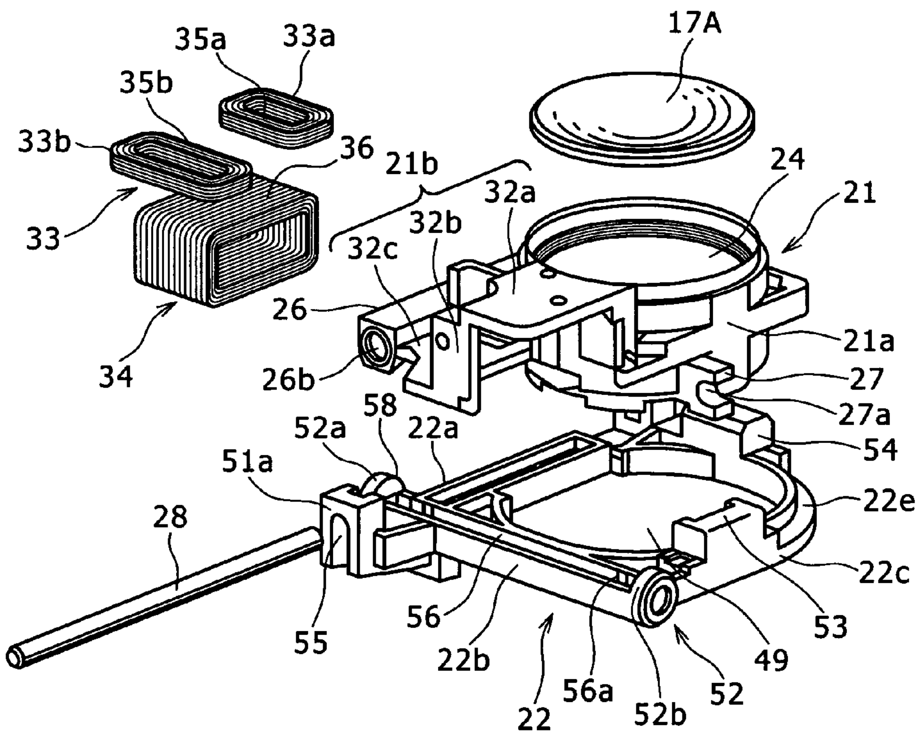
FIG. 16 is a perspective view showing the first movable frame and the second movable frame of the image blur correction apparatus of FIG. 8 in a disassembled state as viewed from the rear side.
Figure 17:
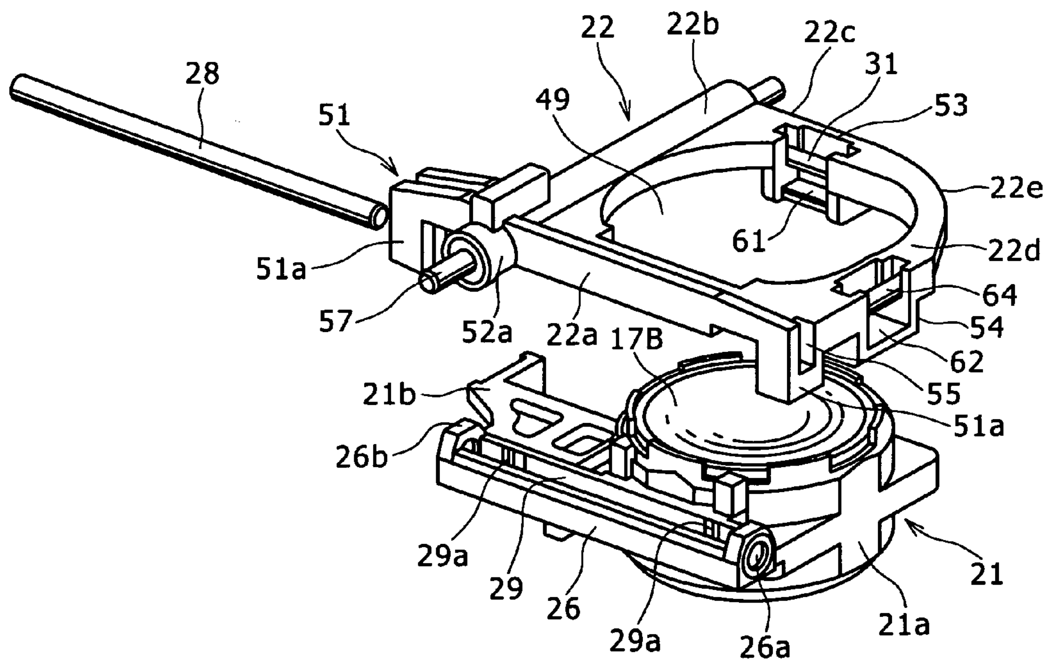
FIG. 17 is a perspective view showing the first movable frame and the second movable frame of the image blur correction apparatus of FIG. 8 in a disassembled state as viewed from the front side and further showing the first movable frame in a disassembled state.
Figure 18:
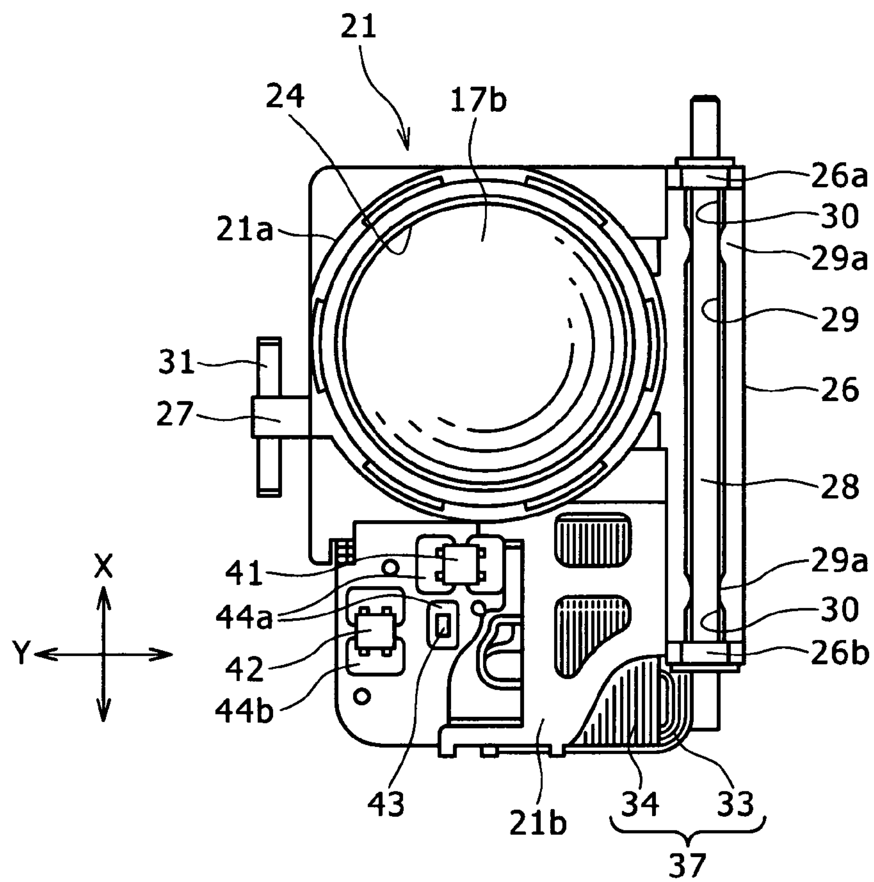
FIG. 18 is a rear elevational view of a movable frame assembly of the image blur correction apparatus of FIG. 8.

The electric actuator 23A shown in FIG. 9 uses the back yoke 48A which has the configuration shown in FIGS. 26 to 29. The electric actuator 23A has a configuration similar to that of the electric actuator 23 described hereinabove except that the back yoke 48A has two projections 81*a* and 81*b* and two recesses 82*a* and 82*b*. Therefore, the electric actuator 23A can be used similarly to the electric actuator 23.

The electric actuator 23 is composed of the coil assembly 37 (composed of the flat coil 33 and the tubular coil 34), yoke 46 (composed of the main yoke 47 and the back yoke 48), and magnet 45. In the electric actuator 23, the flat coil 33, yoke 46 and magnet 45 construct a first electric actuator serving as a first driving section for moving the correction lens 17 in the first direction X through action of the first movable frame 21. Meanwhile, the tubular coil 34, yoke 46 and magnet 45 construct a second electric actuator serving as a second driving section for moving the correction lens 17 in the second direction Y through action of the second movable frame 22 which holds the first movable frame 21 thereon.

In this manner, in the present embodiment, a magnetic circuit member composed of the single magnet 45 and the single yoke 46 serves both as a magnetic circuit for the first driving section and another magnetic circuit for the second driving section. Therefore, there is no necessity to provide a magnetic circuit member for each of different driving sections. Consequently, reduction of the number of parts can be reduced as much, and simplification of the structure and reduction in size of the entire apparatus can be anticipated. Furthermore, in the present embodiment, the single magnet 45 serves also as a magnet for a position detection section for detecting the position of the correction lens 17. Therefore, there is no necessity to separately provide a magnet for the position detection section, and consequently, further simplification of the structure can be anticipated and further reduction in size and weight of the entire apparatus can be anticipated.

The second movable frame 22 which supports the first movable frame 21 having such a configuration as described above for relative movement is formed as a framework having an arcuate portion at a corner thereof from within a framework of a rectangular shape in plan as seen in FIGS. 10 to 17 and 21. In particular, the second movable frame 22 has a first reference frame portion 22*a* and a second reference frame portion 22*b* provided so as to meet perpendicularly with each other at one end thereof in the respective longitudinal directions, and a first opposing frame portion 22*c* formed continuously to the other end of the second reference frame portion 22*b* and extending in parallel and in an opposing relationship to the first reference frame portion 22*a*. The second movable frame 22 further has a second opposing frame portion 22*d* formed continuously to the other end of the first reference frame portion 22*a* and extending in parallel and in an opposing relationship to the second reference frame portion 22*b*, and an arcuate portion 22*e* for arcuately interconnecting the other end of the first opposing frame portion 22*c* and the other end of the second opposing frame portion 22*d*.

The rear face side of the lens fixing portion 21*a* of the first movable frame 21 is inserted in a central hole 49 of the second movable frame 22 surrounded by the first reference frame portion 22*a*, second reference frame portion 22*b*, first opposing frame portion 22*c*, second opposing frame portion 22*d* and arcuate portion 22*e*. The central hole 49 is formed in a substantially elliptical shape having the major axis in the first direction X so that the first movable frame 21 is permitted to move by a predetermined distance in the first direction X but is restricted so as not to move in the second direction Y.

Figure 21:
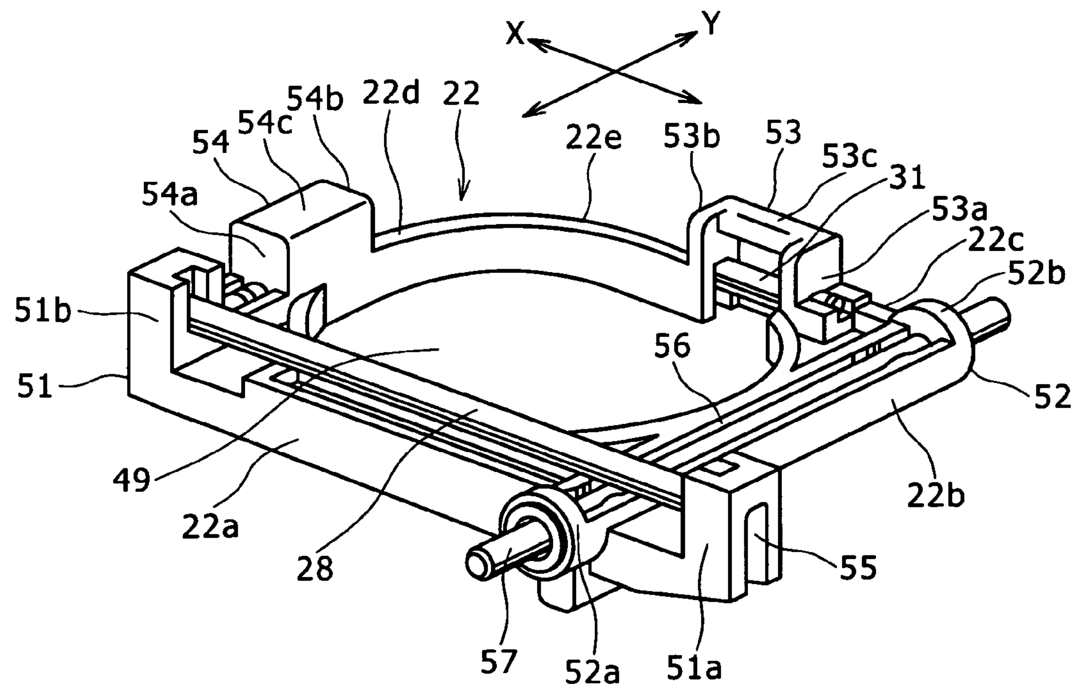
FIG. 21 is a perspective view of the second movable frame of the image blur correction apparatus of FIG. 8 as viewed from the front side.

As seen in FIG. 21 and so forth, a first main bearing portion 51 is provided on the first reference frame portion 22*a* of the second movable frame 22 while a second sliding bearing portion 52 is provided on the second reference frame portion 22*b*. A first sub bearing portion 53 is provided on the first opposing frame portion 22*c* of the second movable frame 22 while a second sub bearing portion 54 is provided on the second opposing frame portion 22*d*.

The first main bearing portion 51 has two bearing pieces 51*a* and 51*b* projecting to one face side (front face side) at the opposite end portions of the first reference frame portion 22*a* in the longitudinal direction, and the first main guide rod 28 is supported at the opposite ends thereof by the two bearing pieces 51*a* and 51*b*. A rod insertion opening 55 is provided at the bearing piece 51*a* of the first main bearing portion 51 such that it extends through the bearing piece 51*a* in a sideward direction in which the first reference frame portion 22*a* extends. The first main guide rod 28 is positioned by inserting it into the rod insertion opening 55 until an end portion of the first main guide rod 28 is brought into contact with the other bearing piece 51*b*. Consequently, the first main guide rod 28 is supported at the opposite ends thereof by the two bearing pieces 51*a* and 51*b*.

The second reference frame portion 22*b* is formed from a pipe-shaped portion having a second escape groove 56 opened to the front face side and has the second sliding bearing portion 52 provided thereon. The second sliding bearing portion 52 has two bearing pieces 52*a* and 52*b* at the opposite ends thereof in the longitudinal direction. A second main guide rod 57 is fitted for sliding movement in the two bearing pieces 52*a* and 52*b*. The second main guide rod 57 projects at the opposite ends thereof outwardly from the opposite ends of the two bearing pieces 52*a* and 52*b*. The projections of the opposite ends of the second main guide rod 57 are supported at the opposite ends thereof by the second lens barrel 3B. The second main guide rod 57 is attached after the movable frame assembly formed from the first movable frame 21 and the second movable frame 22 is mounted on the second lens barrel 3B. In this manner, the second main guide rod 57 is an assembly part for assembling the movable frame assembly to the second lens barrel 3B and serves also as a guide member for guiding the second movable frame 22 in the second direction Y after the assembly.

A pair of semicircular bearing pieces 56*a* and 56*b* are provided at different locations in the second escape groove 56 of the second reference frame portion 22*b* and cooperate with the two bearing pieces 52*a* and 52*b* to form grease sumps 58. Grease as lubricant is filled and retained in the grease sumps 58. Further, bearing holes through which the two bearing pieces 52*a* and 52*b* extend are set such that the center thereof is positioned at a substantially central portion of the second movable frame 22 in the thicknesswise direction. Consequently, the relationship of the first main guide rod 28 and the second main guide rod 57 which extend at the right angle as viewed in plan is set such that the distance therebetween is reduced as much as possible within a range within which the two rods cross without interference with each other. Consequently, the height of the movable frame assembly composed of the first movable frame 21 and the second movable frame 22 is reduced as much as possible to thereby achieve reduction in thickness and size of the movable frame assembly.

The first sub bearing portion 53 of the first opposing frame portion 22*c* and the second sub bearing portion 54 of the second opposing frame portion 22*d* are formed from swollen portions which project to the front face side in the direction same as that of the two bearing pieces 51*a* and 51*b* of the first main bearing portion 51. A first opening 61 is provided in the first sub bearing portion 53 such that it is open to the central hole 49 side of the second movable frame 22. Meanwhile, a second opening 62 is provided in the second sub bearing portion 54 such that it is open to the outer side remote from the central hole 49.

As seen in FIG. 21 and so forth, the first sub bearing portion 53 has two bearing pieces 53*a* and 53*b* provided in a spaced relationship by a predetermined distance from each other in the direction in which the first opposing frame portion 22*c* extends, and an upper face piece 53*c* extending between upper faces of the bearing pieces 53*a* and 53*b*. The first sub guide rod 31 is supported at the opposite ends thereof by the two bearing pieces 53*a* and 53*b* of the first sub bearing portion 53. The first opening 61 is provided on the inner side of the first sub guide rod 31 such that the first rod engaging portion 27 provided on the first movable frame 21 is inserted into the first opening 61.

The second sub bearing portion 54 has two bearing pieces 54*a* and 54*b* provided in a spaced relationship by a predetermined distance from each other in the direction in which the second opposing frame portion 22*d* extends, and an upper face piece 54*c* extending between upper faces of the bearing pieces 54*a* and 54*b*. A second sub guide rod 64 is supported at the opposite ends thereof by the two bearing pieces 54*a* and 54*b* of the second sub bearing portion 54. The second opening 62 is provided on the outer side of the second sub guide rod 64 such that a second rod engaging portion not shown provided on the second lens barrel 3B is inserted therein.

The first sub guide rod 31 fixedly supported on the first sub bearing portion 53 is provided in an offset parallel relationship to the first main guide rod 28 fixedly supported on the first main bearing portion 51. Meanwhile, the second sub guide rod 64 supported on the second sub bearing portion 54 is provided substantially on the same plane with and in parallel to the second main guide rod 57 supported for sliding movement on the second sliding bearing portion 52. The first sub guide rod 31 is disposed on the substantially same plane on the second main guide rod 57 and the second sub guide rod 64 which are disposed on the substantially same plane.

The first main guide rod 28 is formed as a round bar having a necessary length because it plays a role of a guide member for restricting the direction of movement of the first movable frame 21 to the first direction X while it supports the first movable frame 21 for sliding movement. In particular, the length of the first main guide rod 28 is set to the sum of the length of the first sliding bearing portion 26, the amount of movement (stroke) of the first movable frame 21 and the length of supporting portions for supporting the opposite ends of the first main guide rod 28. Meanwhile, the second main guide rod 57 is formed as a round bar having a necessary length because it plays a role of a guide member for restricting the direction of movement of the first movable frame 21 to the second direction Y while it supports the second movable frame 22 for sliding movement. In particular, the length of the second main guide rod 57 is set to the sum of the length of the second sliding bearing portion 52, the amount of movement (stroke) of the second movable frame 22 and the length of supporting portions for supporting the opposite ends of the second main guide rod 57. In the present embodiment, the first main guide rod 28 and the second main guide rod 57 are formed so as to have a substantially equal length.

In contrast, the first sub guide rod 31 is formed as a round bar having a necessary length because it is provided principally in order to support the first movable frame 21 in such a manner as to prevent variation of the posture of the same. In particular, the length of the first sub guide rod 31 is set to the sum of the length of the first rod engaging portion 27, the amount of movement (stroke) of the first movable frame 21 and the length of supporting portions for supporting the opposite ends of the first sub guide rod 31. Meanwhile, the second sub guide rod 64 is formed as a round bar having a necessary length because it is provided principally in order to support the second movable frame 22 in such a manner as to prevent variation of the posture of the same. In particular, the length of the second sub guide rod 64 is set to the sum of the length of the second rod engaging portion, the amount of movement (stroke) of the second movable frame 22 and the length of supporting portions for supporting the opposite ends of the second sub guide rod 64. In the present embodiment, the first sub guide rod 31 and the second sub guide rod 64 are formed so as to have a substantially equal length but are formed sufficiently smaller than the main guide rods.

Figure 6:
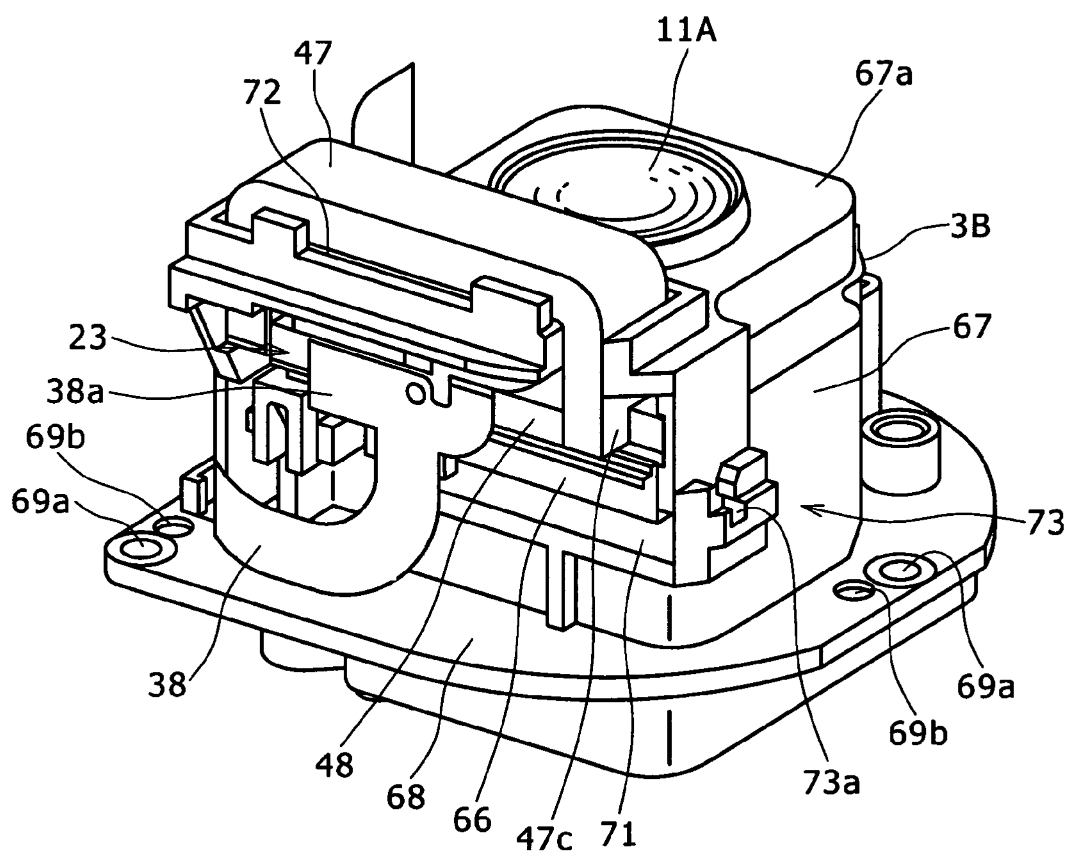
FIG. 6 is a perspective view of the second lens barrel shown in FIG. 5 as viewed from an assembly insertion opening side.
Figure 7:
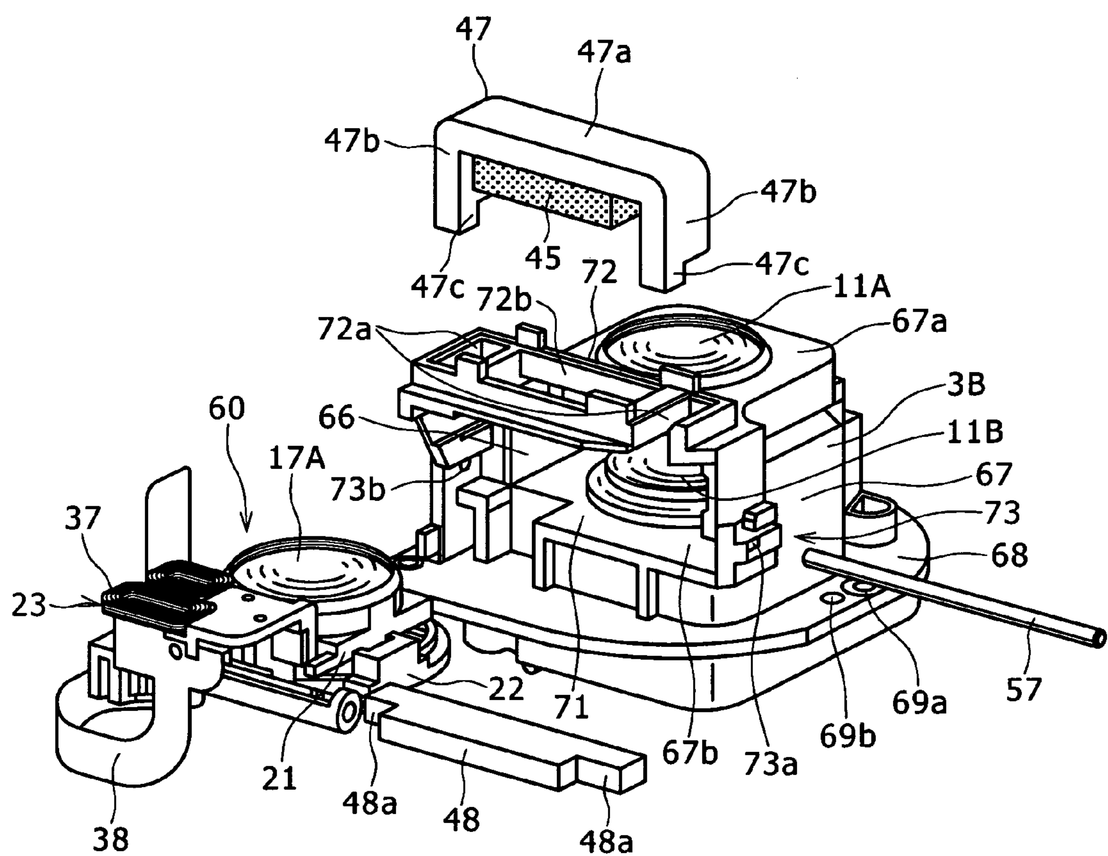
FIG. 7 is an exploded perspective view of the second lens barrel shown in FIG. 6.
Figure 8:
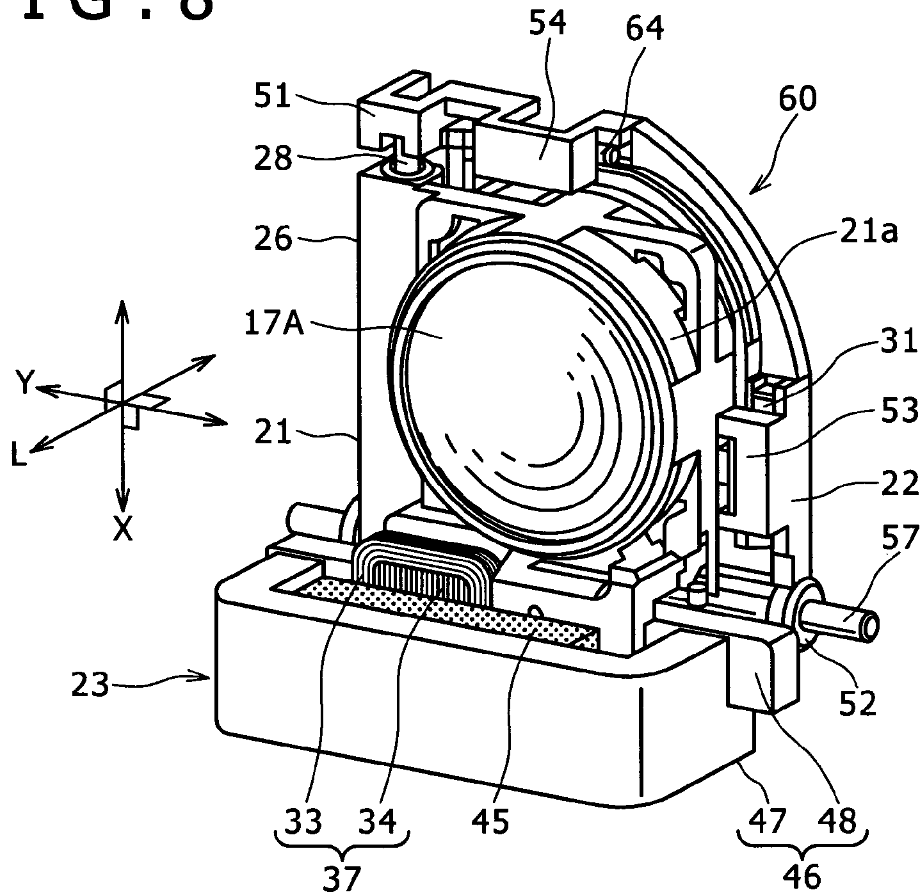
FIG. 8 is a perspective view of an image blur correction apparatus to which the present invention is applied as viewed from the front side.

The second lens barrel 3B on which a movable frame assembly 60 formed by assembling the first movable frame 21 and the second movable frame 22 having such a configuration as described above is removably mounted has such a configuration as shown in FIGS. 6 and 7. Referring to FIGS. 6 and 7, the second lens barrel 3B has a lens barrel portion 67 having a movable frame accommodation portion 66 in which the movable frame assembly 60 is removably mounted, and a flange portion 68 provided integrally on the lens barrel portion 67. The flange portion 68 is used to fasten the second lens barrel 3B to the first lens barrel 3A by means of screws and extends along the outer face of the lens barrel portion 67. A plurality of insertion holes 69*a* into which fastening screws are to be fitted and a plurality of positioning holes 69*b* for positioning the second lens barrel 3B with respect to the first lens barrel 3A are formed on the flange portion 68.

The movable frame accommodation portion 66 is provided in the inside of the lens barrel portion 67 of the second lens barrel 3B and has a space conforming to the outer shape of the movable frame assembly 60. An assembly insertion opening 71 is provided in the lens barrel portion 67 in a communicating relationship with the movable frame accommodation portion 66. The assembly insertion opening 71 in the present embodiment is formed in such a manner as to open downwardly on a lower face of the lens barrel portion 67. The movable frame accommodation portion 66 has the lens barrel portion 67, a front end face portion 67*a* provided so as to close up a front side end face of the lens barrel portion 67, and a partition face portion 67*b* provided in a spaced relationship by a predetermined distance from and substantially in parallel to the front end face portion 67*a*. Through-holes are formed in the front end face portion 67*a* and the partition face portion 67*b* in such a manner that the center lines thereof are registered with each other. The tenth lens 11A is fitted in the through-hole of the front end face portion 67*a* while the eleventh lens 11B is fitted in the through-hole of the partition face portion 67*b*, and the tenth lens 11A and the eleventh lens 11B are secured integrally to the movable frame accommodation portion 66 by adhesion by a bonding agent.

Further, a yoke attaching portion 72 to which the main yoke 47 is attached is provided in the assembly insertion opening 71 of the lens barrel portion 67. The yoke attaching portion 72 has two yoke insertion openings 72*a* into which the side portions 47*b* at the opposite ends of the main yoke 47 are to be inserted, and a magnet insertion opening 72*b* into which the magnet 45 secured to the middle piece 47*a* is to be inserted. The three insertion openings 72*a* and 72*b* are disposed on a line. Further, a second main bearing portion 73 for supporting the opposite ends of the second main guide rod 57 is provided in the assembly insertion opening 71.

The second main bearing portion 73 is formed by providing a bearing hole in the lens barrel portion 67. More particularly, the second main bearing portion 73 is formed by proving two bearing holes 73*a* and 73*b* perforated in a transverse direction on the opposite left and right face portions surrounding the assembly insertion opening 71. The first bearing hole 73*a* of the second main bearing portion 73 extends in the horizontal direction through the face portion while the second bearing hole 73*b* has a locking portion provided therein for preventing movement thereof to the outer side. The second main guide rod 57 is assembled to the second main bearing portion 73 by mounting the movable frame assembly 60 on the movable frame accommodation portion 66 and then inserting the second main guide rod 57 into the second main bearing portion 73 from the first bearing hole 73*a* side. The second main guide rod 57 is positioned at a predetermined position by inserting the same until an end thereof is brought into contact with the bottom face of the second bearing hole 73*b*.

The second rod engaging portion (not shown) is provided in the inside of the movable frame accommodation portion 66 such that it is engaged for sliding movement with the second sub guide rod 64 supported by the second sub bearing portion 54 of the second movable frame 22 of the movable frame assembly 60 mounted in position. The second rod engaging portion has a configuration substantially similar to that of the first rod engaging portion 27 provided on the first movable frame 21, and is formed by providing a rod engaging groove on a projection which projects into the movable frame accommodation portion 66. The second rod engaging portion is set to a position corresponding to the second sub guide rod 64 such that, only if the movable frame assembly 60 is inserted into the movable frame accommodation portion 66, then the second sub guide rod 64 is engaged with the second rod engaging portion. Further, a portion of the lens barrel portion 67 remote from the front end face portion 67*a* is formed as an angular tube, to which the CCD element adapter 18 is fastened by screws.

The first main guide rod 28 and the first sub guide rod 31, the first sliding bearing portion 26 and the first rod engaging portion 27 of the first movable frame 21, and the first main bearing portion 51 and the first sub bearing portion 53 of the second movable frame 52 cooperatively form a first guide section for guiding the correction lens 17 in the first direction X perpendicular to the optical axis L of the lens apparatus 1 through the first movable frame 21. Further, the second main guide rod 57 and the second sub guide rod 64, the second sliding bearing portion 52 and the second sub bearing portion 54 of the second movable frame 22, and the second main bearing portion 73 and the second rod engaging portion of the second lens barrel 3B cooperatively form a second guide section for guiding the correction lens 17 in the second direction Y perpendicular to the optical axis L of the lens apparatus 1 and perpendicular also to the first direction X through the second movable frame 22.

Further, the first main guide rod 28 and the first sub guide rod 31 construct a first group of two guide rods. The first main bearing portion 51 and the first sub bearing portion 53 construct a first group of two fixed support portions. The first sliding bearing portion 26 and the first rod engaging portion 27 construct a first group of two sliding support portions. The second main guide rod 57 and the second sub guide rod 64 construct a second group of two guide rods. The second main bearing portion 73 and the second sub bearing portion 54 construct a second group of two fixed support portions. The second sliding bearing portion 52 and the second rod engaging portion construct a second group of two sliding support portions.

An assembling work of the movable frame assembly 60 and the image blur correction apparatus 5 having such a configuration as described above is carried out, for example, in the following manner. First, an assembling work of the movable frame assembly 60 is described. This work is started, for example, from attachment of the two correction lenses 17A and 17B to the lens fixing portion 21*a* of the first movable frame 21. Then, the coil assembly 37 composed of the flat coil 33 and the tubular coil 34, the two Hall elements 41 and 42 and the thermistor 43 are attached to predetermined positions of the coil fixing portion 21*b* of the first movable frame 21. In this instance, the coil assembly 37 may be mounted on the coil connection portion 38*a* of the flexible circuit board 38 in advance, and the two Hall elements 41 and 42 and the thermistor 43 may be mounted on the sensor connection portion 38*b* of the flexible circuit board 38 similarly in advance.

Thereafter, the first movable frame 21 to which the correction lens 17 and so forth are attached is assembled to the second movable frame 22. In this instance, the rear face of the first movable frame 21 is opposed to the front face of the second movable frame 22 from which the sub bearing portions 53 and 54 and so forth project, and the first sliding bearing portion 26 of the first movable frame 21 is opposed to the first reference frame portion 22*a* of the second movable frame 22. Then, the first rod engaging portion 27 of the first movable frame 21 is inserted into the first opening 61 of the first sub bearing portion 53, and the first sub guide rod 31 is engaged with the rod engaging groove 27*a* of the first rod engaging portion 27. Before or after this, the first sliding bearing portion 26 is inserted into the first main bearing portion 51 provided on the first reference frame portion 22*a*. Then, the first main guide rod 28 is inserted into the first main bearing portion 51 from the bearing piece 51*a* side so as to extend through the first sliding bearing portion 26 provided in the first movable frame 21 until an end portion thereof is fitted with the bearing piece 51*b* provided on the second movable frame 22.

The assembly process of the first movable frame 21 and the second movable frame 22 is competed therewith. In this state, the first movable frame 21 can move by a predetermined stroke in the direction of the first main guide rod 28 and the first sub guide rod 31 (in the present embodiment, in the first direction X) under the guidance of the first main guide rod 28 and the first sub guide rod 31. Accordingly, in this instance, the correction lens 17 can move by a distance equal to the amount of movement of the first movable frame 21 in the axial direction of the first main guide rod 28.

Then, the back yoke 48 which is a component of the yoke 46 is inserted into the space provided in the coil fixing portion 21*b* of the first movable frame 21 of the movable frame assembly 60 as seen in FIG. 7 until the opposite ends thereof project from the opposite sides of the space. While this state is maintained, the movable frame assembly 60 is inserted into the movable frame accommodation portion 66 of the second lens barrel 3B from the opposite side of the coil assembly 37. At this time, if the movable frame assembly 60 is inserted to a predetermined position, then the second rod engaging portion provided in the movable frame accommodation portion 66 is inserted into the second opening 62 provided in the second sub bearing portion of the second movable frame 22 until the second sub guide rod 64 is engaged with the rod engaging groove of the second rod engaging portion.

Then, the second main guide rod 57 is inserted into the second main bearing portion 73 provided on the second lens barrel 3B from the first bearing hole 73*a* side until it extends through the second sliding bearing portion 52 provided in the second movable frame 22 and an end portion thereof is fitted with the second bearing piece 73*b*. Thereafter, the main yoke 47 which forms a principal portion of the yoke 46 is opposed to the yoke attaching portion 72 of the second lens barrel 3B. Then, the side pieces 47*b* provided at the opposite ends of the main yoke 47 are inserted into the two yoke insertion openings 72*a* of the yoke attaching portion 72, and the magnet 45 secured to the middle piece 47*a* is inserted into the magnet insertion opening 72*b* of the yoke attaching portion 72. At this time, if the main yoke 47 is inserted to a predetermined depth, then the engaging pieces 47*c* provided at the ends of the side pieces 47*b* are engaged with the cutaway portions 48*a* provided at the opposite ends of the back yoke 48.

The assembling process of the movable frame assembly 60 to the second lens barrel 3B is completed therewith. At this time, since the main yoke 47 is engaged with the back yoke 48, coming off of the movable frame assembly 60 from the second lens barrel 3B is prevented. In this assembled state, the second movable frame 22 is permitted to move by a predetermined stroke in a direction of the second main guide rod 57 and the second sub guide rod 64 (in the present embodiment, in the second direction Y) under the guidance of the second main guide rod 57 and the second sub guide rod 64. Accordingly, the correction lens 17 and hence the entire image blur correction apparatus 5 can move by predetermined distances in the first direction X and the second direction Y.

In the present embodiment, the direction in which the first main guide rod 28 and the first sub guide rod 31 extend is defined as the first direction X, and the direction which is perpendicular to the first direction X and in which the second main guide rod 57 and the second sub guide rod 64 extend is defined as the second direction Y. However, naturally the first and second directions X and Y may be opposite to those in the present embodiment.

The image blur correction apparatus 5 having such a configuration as described above acts in the following manner. Movement of the correction lens 17 of the image blur correction apparatus 5 is executed by selectively or simultaneously supplying driving current of a suitable value to the flat coil 33 and the tubular coil 34 of the electric actuator 23 through the flexible circuit board 38.

In this instance, the flat coil 33 and the tubular coil 34 of the image blur correction apparatus 5 are attached to the first movable frame 21, and the first movable frame 21 is supported for movement in a direction specified by the first guide section with respect to the second movable frame 22. Then, the second movable frame 22 is supported for movement in a direction specified by the second guide section with respect to the second lens barrel 3B which is a rear lens barrel. In the present embodiment, the flat coil 33 and the tubular coil 34 are disposed such that the propelling force generation portions 35*a* and 35*b* of the two coil portions 33*a* and 33*b* of the flat coil 33 extend in the second direction Y (for example, in a horizontal direction) and the propelling force generation portion 36 of the tubular coil 34 extends in the first direction X (for example, in a vertical direction).

Further, the second lens barrel 3B is secured to the first lens barrel 3A which is a front lens barrel and is attached to the image pickup apparatus through the first lens barrel 3A. The yoke 46 composed of the main yoke 47 and the back yoke 48 is mounted on the second lens barrel 3B, and the second lens barrel 3B is secured by combining the two yokes 47 and 48. At this time, the magnet 45 secured to the main yoke 47 is opposed to the propelling force generation portions 35*a* and 35*b* of the coil portions 33*a* and 33*b* of the flat coil 33, and the propelling force generation portion 36 of the tubular coil 34 is opposed below them. Then, the back yoke 48 is fitted in the hole of the tubular coil 34 thereby to form a magnetic circuit wherein magnetic force of the magnet 45 is vertically transmitted through the two propelling force generation portions 35*a* and 35*b* and the propelling force generation portion 36.

By the configuration described, magnetic fluxes of the magnetic circuit including the magnet 45 pass vertically through the propelling force generation portions 35*a* and 35*b* of the flat coil 33 and the propelling force generation portion 36 of the tubular coil 34. On the other hand, since the yoke 46 and the magnet 45 are secured to the second lens barrel 3B, the correction lens 17 is moved in the first direction X and the second direction Y by propelling force generated by the magnetic force of the magnet 45.

In particular, the correction lens 17 is moved within a predetermined range in the first direction X under the guidance of the first guiding section by action of the first electric actuator composed of the flat coil 33, magnet 45 and yoke 46. Further, the correction lens 17 is moved within a predetermined range in the second direction Y under the guidance of the second guiding section by action of the second electric actuator composed of the tubular coil 34, magnet 45 and yoke 46. Accordingly, the correction lens 17 can move freely in any of the first direction X and the second direction Y within a predetermined range by action of the first guiding section and the second guiding section.

Now, if electric current is supplied to the flat coil 33, then since the propelling force generation portions 35*a* and 35*b* of the flat coil 33 extend in the second direction Y, the current flows in the second direction Y in the propelling force generation portions 35*a* and 35*b*. At this time, since magnetic fluxes of the magnetic circuit act in the upward and downward direction perpendicular to the propelling force generation portions 35*a* and 35*b*, force acting toward the first direction X acts upon the magnet 45 and the yoke 46. Consequently, the first movable frame 21 to which the flat coil 33 is secured moves in the first direction X under the guidance of the first guiding section. As a result, the correction lens 17 held by the first movable frame 21 moves in the first direction X together with the first movable frame 21 in response to the magnitude of the current flowing through the flat coil 33.

On the other hand, if current is supplied to the tubular coil 34, then since the propelling force generation portion 36 of the tubular coil 34 extends in the first direction X, the current flows in the first direction X in the propelling force generation portion 36. At this time, since magnetic fluxes of the magnetic circuit act in the upward and downward direction perpendicularly to the propelling force generation portion 36, force in the second direction Y acts upon the magnet 45 and the yoke 46 in accordance with the Fleming's rule. Consequently, the second movable frame 22 which holds the first movable frame 21 thereon moves in the second direction Y under the guidance of the second guiding section. As a result, the correction lens 17 held by the first movable frame 21 moves in the second direction Y together with the first movable frame 21 and the second movable frame 22 in response to the magnitude of the current flowing through the tubular coil 34.

However, if current is supplied simultaneously to both of the flat coil 33 and the tubular coil 34, then the moving action by the flat coil 33 and the moving action by the tubular coil 34 described above are executed compositely. In particular, when the correction lens 17 moves in the first direction X by action of the current flowing through the flat coil 33, it simultaneously moves in the second direction Y by action of the current flowing through the tubular coil 34. As a result, the correction lens 17 moves in an oblique direction to correct image blur of the lens system 2.

Figure 1:
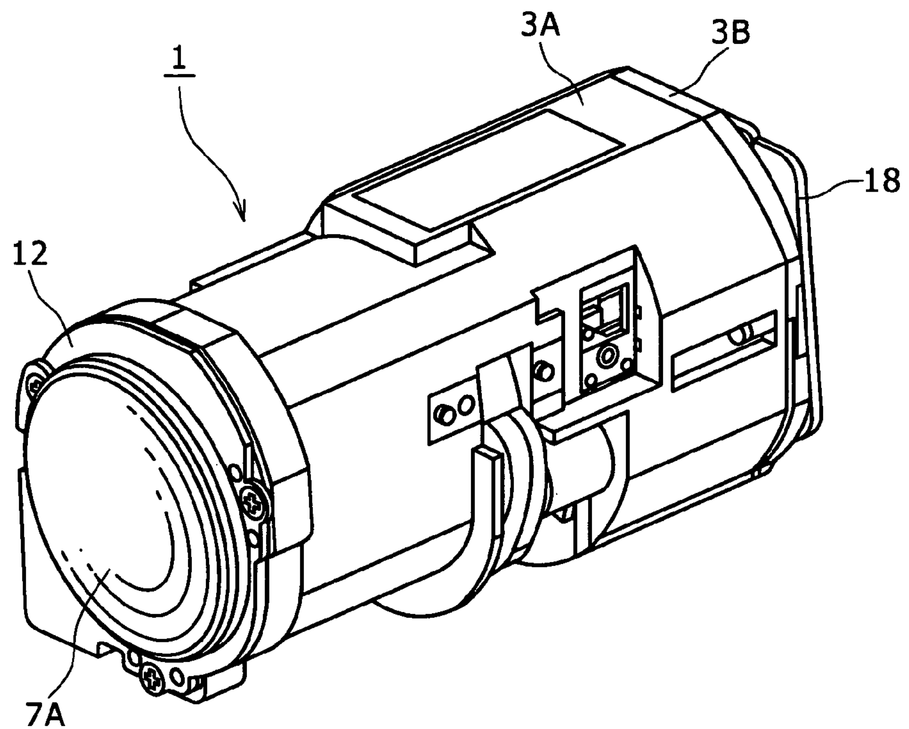
FIG. 1 shows a lens apparatus to which the present invention is applied and is a perspective view as viewed from the front face side.
Figure 3:
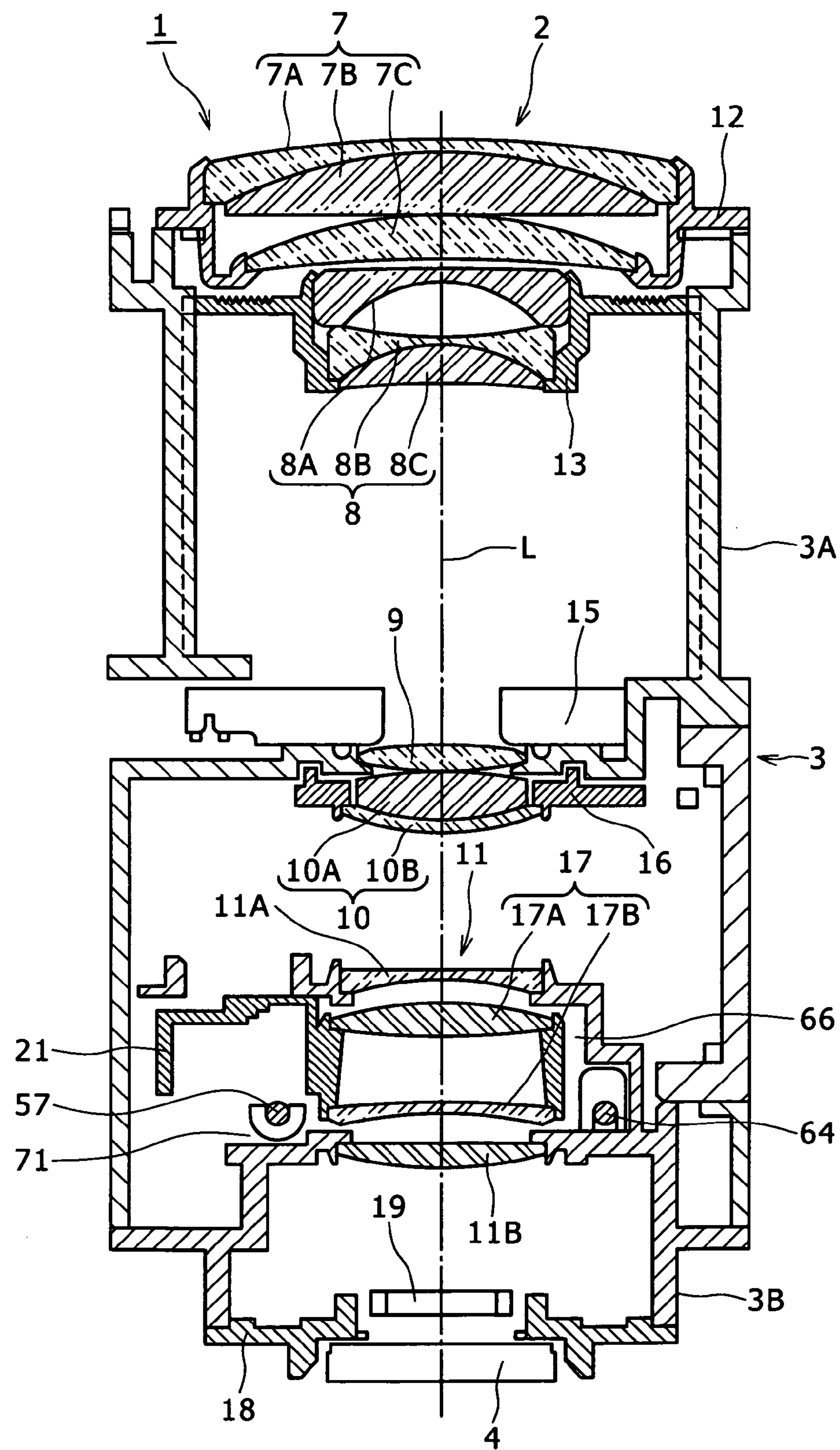
FIG. 3 is a sectional view of the lens apparatus of FIG. 1 taken along the optical axis of a lens system.

The image blur correction apparatus 5 having such a configuration and action as described above is attached to the lens apparatus 1 as seen in FIGS. 1 to 3. The image blur correction apparatus 5 is moved into and out of the second lens barrel 3B of the lens barrel 3 through the assembly insertion opening 71 provided on the side face of the second lens barrel 3B and is removably mounted on the movable frame accommodation portion 66. In this instance, since the image blur correction apparatus 5 is formed as a unit, the removing or mounting operation of the image blur correction apparatus 5 can be performed very simply and rapidly.

Now, action of the lens system 2 of the lens apparatus 1 on which the image blur correction apparatus 5 is mounted is described with reference to FIG. 4. If the first lens 7A which is an objective lens of the lens system 2 is directed to an image pickup subject, then light from the image pickup subject is inputted to the lens system 2 through the first lens 7A. At this time, the light transmitted through the first lens 7A is thereafter transmitted through the second lens 7B and the third lens 7C and then advances toward the CCD element 4 along the optical axis L of the lens system 2. In particular, the light emerging from the third lens 7C of the first lens group 7 is transmitted through the second lens group 8 composed of the fourth lens 8A, fifth lens 8B and sixth lens 8C and then transmitted through third lens group 9 of the seventh lens and the fourth lens group 10 composed of the eighth lens 10A and the ninth lens 10B. Thereafter, the light is transmitted through the tenth lens 11A of the fifth lens group 11 and the correction lens 17 composed of the correction lens 17A and the correction lens 17B and then through the eleventh lens 11B of the fifth lens group 11. Consequently, an image corresponding to the image pickup subject is formed on the image forming plane of the CCD element 4 through the optical filter 19.

In this instance, when no shake nor vibration occurs with the lens apparatus 1 upon the image pickup, the light from the image pickup subject advances along the optical axis L past central portions of the first to fifth group lenses as indicated as light 6A by solid lines. Therefore, the light forms an image at a predetermined position on the image forming plane of the CCD element 4, and consequently, a clean image free from image blur can be obtained.

On the other hand, if a shake or vibration occurs with the lens apparatus 1 upon the image pickup, then the light from the image pickup subject is inputted in an inclined state to the first lens group 7 as seen from light 6B indicated by alternate long and short dash lines. The light 6B is transmitted through each of the first to fifth group lenses in a state displaced from the optical axis L. However, the camera shake or the like can be corrected by moving the correction lens 17 by a predetermined amount in response to the camera shake or the like. Consequently, an image can be formed at a predetermined position on the image forming plane of the CCD element 4, and as a result, a clean image free from image blur can be obtained.

Presence or absence of a camera shake, a vibration or the like of the lens apparatus 1 is detected by a blur detection section. For example, a gyro sensor can be used as the blur detection section. The gyro sensor is incorporated in a camera body together with the lens apparatus 1 so that an acceleration, an angular velocity, an angular acceleration and so forth caused by a shake of a hand of the image pickup person, a swaying motion or the like may be detected. The information of the acceleration, angular velocity, angular acceleration and so forth detected by the gyro sensor is supplied to the control apparatus. The control apparatus controls and drives the electric actuator 23 composed of the first electric actuator and the second electric actuator so that an image is formed at a predetermined position on the image forming plane of the CCD element 4. In particular, the control apparatus controls the electric actuator 23 such that, if the lens apparatus 1 moves in the first direction X by a swaying motion, then the first movable frame 21 is moves in the first direction X, but if the lens apparatus 1 moves in the second direction Y, then the second movable frame 22 is moved in the second direction Y.

Figure 30:
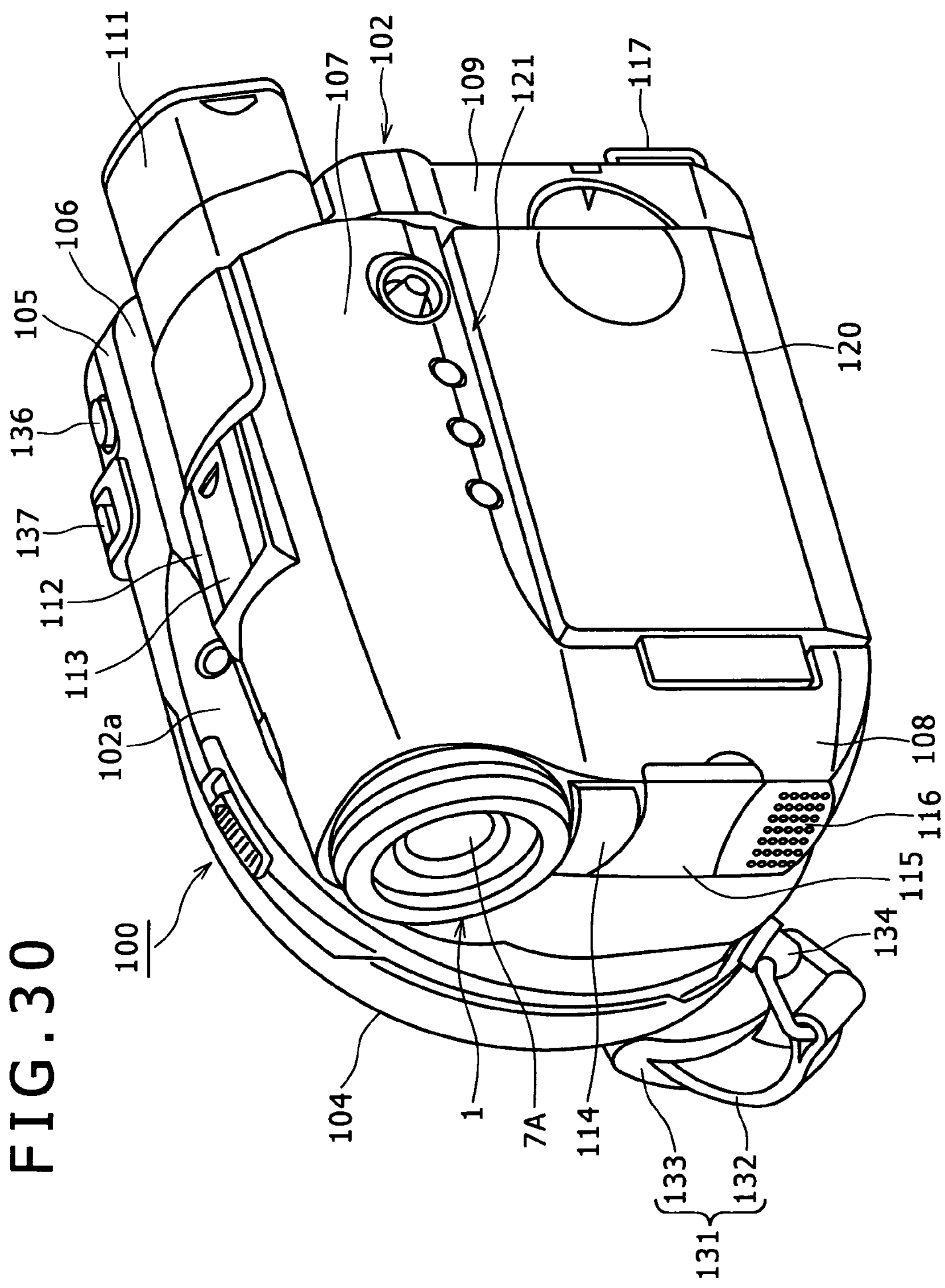
FIG. 30 is a perspective view of a disk type image pickup apparatus as an image pickup apparatus to which the present invention is applied as viewed from the front side.
Figure 31:
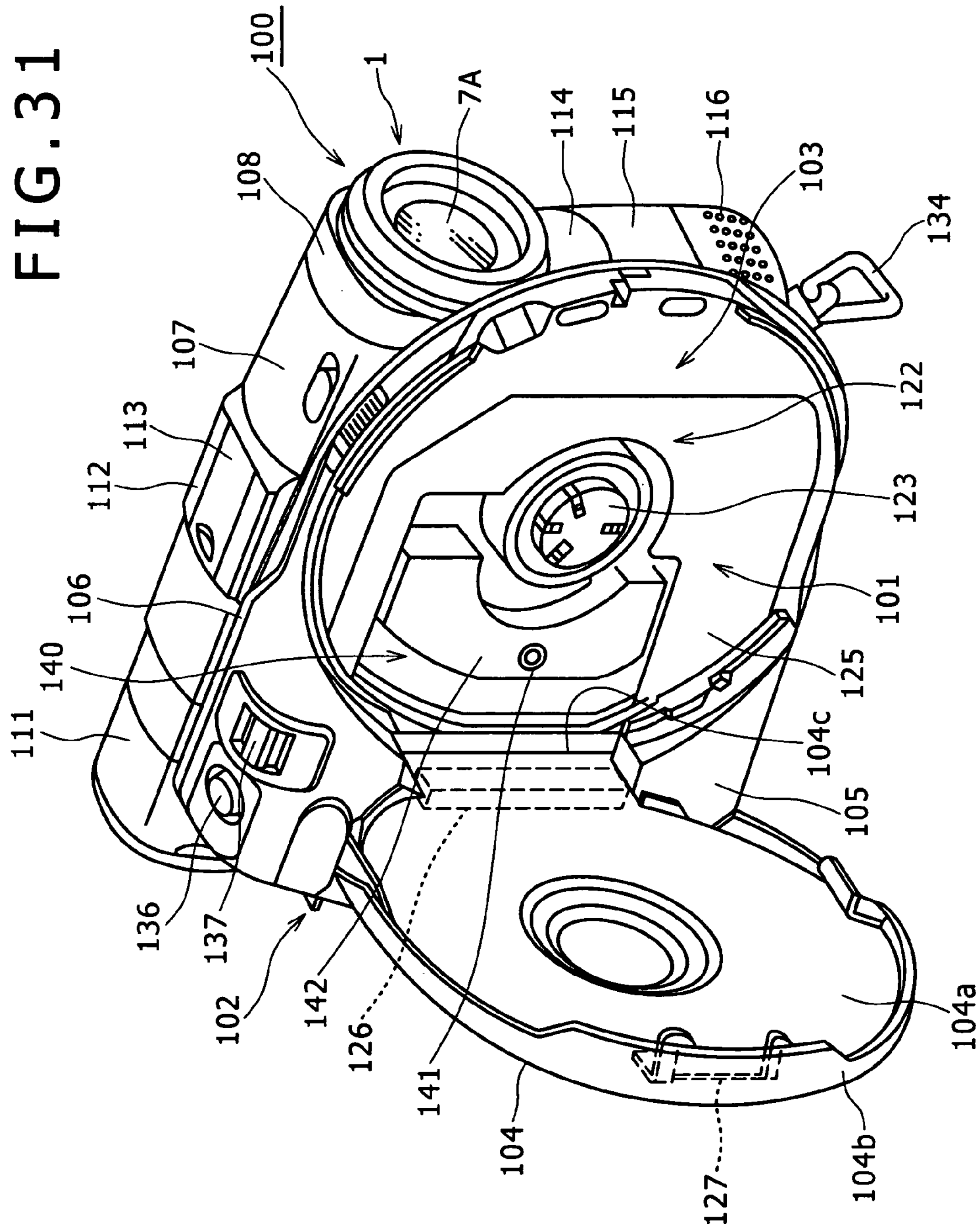
FIG. 31 is a perspective view of the disk type image pickup apparatus of FIG. 30 as viewed from the front wide with a disk lid opened to expose a disk drive apparatus.

FIGS. 30 and 31 show an optical disk type image pickup apparatus (disk type video camera) 100 to which the present invention is applied and which includes the lens apparatus 1 having such a configuration as described above. Referring to FIGS. 30 and 31, the optical disk type image pickup apparatus 100 is generally configured such that an optical disk digital video disk-recordable (DVD-R) of a diameter of 8 cm is used as a particular example of a disk type recording medium as an information recording medium. Further, a CCD device (solid-state image pickup device) which is a particular one of an image pickup section converts an optical image into an electric signal, and the electric signal can be recorded on the DVD-R or displayed on a display apparatus such as a liquid crystal monitor or the like.

However, the image pickup apparatus to which the present invention is not limited to the optical disk type image pickup apparatus 100, but can be applied not only to an image pickup apparatus which can record an information signal using a disk-type recording medium such as a magneto-optical disk type image pickup apparatus or a magnetic disk type image pickup apparatus but also to an image pickup apparatus which uses an information storage medium of any other form such as, for example, a tape-type recording medium or a semiconductor recording medium.

The optical disk type image pickup apparatus 100 includes a disk drive apparatus 101 for driving an optical disk (DVD-R) removably loaded therein to rotate to perform recording (writing) and reproduction (reading out) of an information signal. Further, the optical disk type image pickup apparatus 100 includes a control circuit not shown for performing driving control of the disk drive apparatus 101 and so forth, and the lens apparatus 1 for fetching an image of an image pickup subject as light and introducing the light to the CCD element 4. The optical disk type image pickup apparatus 100 further includes an outer case 102 in which the disk drive apparatus 101 and so forth are accommodated, and a disk lid 104 mounted for pivotal motion on the outer case 102 to cover or uncover the disk accommodation chamber 103.

The outer case 102 includes a disk side panel 105, a central panel 106 and a display apparatus side panel 107 combined in an overlapping relationship with each other in three layers, a front panel 108 and a rear panel 109 disposed forwardly and rearwardly in the direction of the optical axis of the lens apparatus 1 and combined with the panels 105 to 107, and a partition panel not shown disposed on the inner side of the central panel 106. A hollow housing is formed from the panels 105 to 109. The disk drive apparatus 101 is resiliently supported on a face of the partition panel adjacent the disk side panel 105 with a mount insulator interposed therebetween. The panels 105 to 109 are constructed such that they can be assembled and disassembled at suitable portions thereof overlapped with each other or through another member by fastening screws serving as fixing members.

The lens apparatus 1 is secured in a built-in state to an upper portion of the outer case 102, and the first lens 7A extends forwardly through an upper portion of the front panel 108 and is exposed to the front face. It is to be noted that, though not shown, a CCD device is disposed rearwardly of the lens apparatus 1 in the inside of the outer case 102, and a viewfinder 111 is disposed rearwardly of the CCD device.

The viewfinder 111 is exposed to an upper portion of the outer case 102 and disposed for back and forth movement by a predetermined distance in the direction of the optical axis of the lens apparatus 1 by a finder moving mechanism. The viewfinder 111 is mounted for pivotal motion around a front side portion thereof such that a rear side portion thereof moves in upward and downward directions. Consequently, the viewfinder 111 can be angularly adjusted to an arbitrary angle within a predetermined angular range (in the present embodiment, within approximately 90 degrees) from a horizontal position in which the viewfinder 111 extends in parallel to the optical axis of the lens apparatus 1 to an upwardly directed position in which the rear portion is erected uprightly. The angular adjustment of the viewfinder 111 can be executed at an arbitrary position of the finder moving mechanism from a front end portion to a rear end portion.

An accessory shoe 112 is attached to an upper portion of the outer case 102, and an accessory such as a video light or an externally provided microphone is removably mounted on the accessory shoe 112. The accessory shoe 112 is disposed immediately forwardly of the viewfinder 111 such that, when the viewfinder 111 is moved rearwardly, an inlet opening to the accessory shoe 112 is opened. An accessory can be mounted in the state wherein the insertion opening is open, and if the viewfinder 111 is moved forwardly after an accessory is mounted, then the insertion opening is closed by the viewfinder 111 thereby to disable removal of the accessory. A shoe cap 113 which serves as a lid for filling the space when the accessory shoe 112 is not used is normally mounted on the accessory shoe 112.

A remote controller light reception section 114, a microphone terminal and a stereo-type built-in microphone 116 are disposed in order from above on the front face of the front panel 108. The remote controller light reception section 114 serves as a reception section for a remote control operation. The remote controller light reception section 114 serves also as an infrared light emitting section for emitting infrared rays to be used for automatic focusing and so forth. The microphone terminal includes an image terminal and a sound terminal, which are covered with a terminal cover 115 so as to be opened or closed.

Though not shown, a battery accommodation section in which a power supply battery is to be removably mounted is provided on the rear panel 109 of the outer case 102. The battery accommodation section is open to the rear face and the lower face of the rear panel 109 such that a power supply battery can be inserted into the battery accommodation section from an obliquely backwardly downward position and removed in the opposite direction. Further, two support metal members 117 for a suspending strap are attached to the rear panel 109.

Referring to FIG. 30, a display apparatus 120 is attached to the display apparatus side panel 107 of the outer case 102 such that the posture thereof can be varied. The display apparatus 120 includes a liquid crystal monitor in the form of a flat plate, a panel case in which the liquid crystal monitor is accommodated, and a panel supporting section for supporting the panel case on the outer case 102 such that the posture thereof can be varied. The panel supporting section has a horizontally pivoting function of permitting pivotal motion of the panel case by approximately 90 degrees in a horizontal direction around a vertical axis and a forward and backward pivotal function of permitting pivotal motion of the panel case by approximately 270 degrees from a horizontal position to a downwardly extending position around a horizontal axis.

Consequently, the display apparatus 120 can arbitrarily assume various positions including an accommodation position in which the display apparatus 120 is accommodated in the side face of the outer case 102 as seen in FIG. 30, another position in which the panel case is pivoted by 90 degrees such that the liquid crystal monitor is directed rearwardly, a further position in which the panel case is pivoted by 180 degrees such that the liquid crystal monitor is directed forwardly, and an intermediate position between or among the positions mentioned. Further, an operation section 121 including a plurality of operation buttons is provided at an upper portion of the display apparatus side panel 107.

Referring to FIG. 31, the disk accommodation chamber 103 is provided on one side face of the outer case 102 such that a disk-type recording medium is removably mounted therein. The disk accommodation chamber 103 has a fixed region having an opening for exposing part of the disk drive apparatus 101 therethrough. In the present. embodiment, the disk accommodation chamber 103 has a region of a size corresponding to an optical disk (DVD-R) of a diameter of 8 cm as a particular example of the disk type recording medium. A table rotating apparatus 122 serving as a rotational driving section for the disk drive apparatus 101 is disposed at a substantially central portion of the disk accommodation chamber 103 such that an optical disk can be removably mounted on a turntable 123 disposed at a substantially central portion of the table rotating apparatus 122.

The disk drive apparatus 101 is secured to the outer case 102 through a chassis 125. The disk accommodation chamber 103 in which the disk drive apparatus 101 is disposed is covered for opening and closing relationship with the disk lid 104 which is supported at a side face portion thereof for pivotal motion on the disk side panel 105. The disk lid 104 has a shape conforming to the shape of the disk accommodation chamber 103 and is secured to the outer case 102 by a lid pivotal shaft portion 126 attached to the rear face side of the disk lid 104. The disk lid 104 has a flat face portion 104*a* for covering the disk accommodation chamber 103, and a peripheral face portion 104*b* connected over a substantially entire periphery of an outer circumferential edge of the flat face portion 104*a*. The peripheral face portion 104*b* of the disk lid 104 is formed for fitting with a cutaway portion of an outer circumferential side of the disk accommodation chamber 103 of the disk side panel 105.

Thought not shown, the lid pivotal shaft portion 126 includes a support rod extending through a rectangular portion 104*c* provided on the rear face side of the disk lid 104, and a bearing member having a pair of bearing pieces for fixedly supporting the opposite ends of the support rod. The bearing member is secured to the disk side panel 105 to support the disk lid 104 for pivotal motion. The lid pivotal shaft portion 126 has a stopper element provided thereon for setting a maximum opening angle (for example, 90 degrees) of the disk lid 104.

Such a lid pivotal shaft portion 126 as described above is attached to the disk side panel 105 such that the axial direction of the support rod thereof is directed in the upward and downward direction. Consequently, the disk lid 104 is supported for pivotal motion at a rear portion of the disk side panel 105 through the lid pivotal shaft portion 126. As a result, the disk lid 104 can be pivoted open sidewardly to approximately 90 degrees by opening the same forwardly where the front face of the optical disk type image pickup apparatus 100 is directed to the front side. It is to be noted that a spring member is mounted on the lid pivotal shaft portion 126 and operates the disk lid 104 such that the disk lid 104 can be stopped at an arbitrary open position within a range of a fixed opening angle but, if the opening angle is exceeded, then the disk lid 104 is biased toward the opening side.

Though not shown, a lid opening/closing mechanism for the disk lid 104 is provided between the disk side panel 105 and the central panel 106. The lid opening/closing mechanism has a function of locking the disk lid 104 in a state wherein it closes the disk accommodation chamber 103 to the closing state and another function of releasing the locking state. Corresponding to the lid opening/closing mechanism, a locking member 127 is attached to the inner face of the disk lid 104.

A hand belt 131 is attached to the disk side panel 105 in such a manner as to surround the disk lid 104. The hand belt 131 supports the hand of a user who grasps the grip portion 102*a* of the outer case 102 to prevent the optical disk type image pickup apparatus 100 from dropping or the like. The hand belt 131 is composed of a belt member 132 secured at the opposite ends thereof to the disk side panel 105, and a protective pad 133 mounted on the belt member 132 for contacting with the back of the hand of the user. The belt member 132 is connected at an end thereof to a metal fixture 134 secured to a lower portion of the front side of the disk side panel 105 and is inserted at the other end thereof in the inside of the disk side panel 105 through a through-hole formed at an intermediate portion of the rear side of the disk side panel 105 and secured to a metal fixture attached in the inside of the disk side panel 105.

Though not shown, a power supply button, a mode changeover dial and a recording button are disposed at a rear portion of the disk side panel 105. The mode changeover dial has a ring shape, and the power supply button is accommodated in the hole of the mode changeover dial. The power supply button is formed from a switch element of the push-push type, and power supply from the power supply battery is turned on or off in response to a depression operation of the power supply button. The mode changeover dial is provided to select an operation mode for recording or the like and can select an arbitrary mode from among a "still picture mode," a "recording mode" and a "viewing-editing mode" in response to a turning operation thereof. The recording button is formed from a switch element of the push-push type, and starting and stopping of image pickup of moving pictures are repeated in response to a depression operation of the recording button.

Further, as seen in FIG. 31, a shutter button 136 and a zoom lever 137 are disposed at an upper portion of the rear side of the disk side panel 105. The shutter button 136 is provided for picking up a still picture, and a still picture is picked up in response to every one depression operation of the shutter button 136. The zoom lever 137 is provided to enlarge or reduce an image upon image pickup, reproduction or the like, and the magnification can be adjusted non-stepwise within a fixed range in response to the amount of the operation.

For example, an acrylonitrile-butadien-styrene resin (ABS) material is suitably applied as a material for the disk side panel 105, central panel 106, display apparatus side panel 107, front panel 108 and rear panel 109 which compose the outer case 102. However, the material is not limited to an ABS material, but naturally not only any other engineering plastic material can be applied but some other metal material such as an aluminum alloy can be used.

Further, the inside of the outer case 102 is partitioned in the leftward and rightward direction (direction perpendicular to the optical axis of the lens apparatus 1) by a partition panel such that a first chamber on the disk lid 104 side and a second chamber on the display apparatus side are formed. The partition panel is formed from a member in the form of a plate and is securely fastened in the inside of the outer case 102 by means of fastening screws. As a material for the partition panel, for example, stainless steel (SUS) is suitably applied. However, not only a stainless steel material, an aluminum allow and some metal material can be applied, but also an engineering plastic material other than metal materials can be used.

Though not shown, the disk drive apparatus 101 is accommodated in the first chamber of the outer case 102, and the lens apparatus 1, the control circuit section and so forth are accommodated in the second chamber. Therefore, a plurality of supporting projections for supporting the disk drive apparatus 101 are provided on one face side of the partition panel while a plurality of supporting pieces for supporting the lens apparatus 1, a printed circuit board and so forth are provided on the other face side of the partition panel. The control circuit section is formed, for example, from a microcomputer, a storage apparatus (RAM or ROM), electronic parts such as capacitors and registers, a printed circuit board on which those electronic parts are mounted, and so forth.

The disk drive apparatus 101 includes the chassis 125 attached to the outer case 102 through a member on the case side such as the partition panel, the table rotating apparatus 122 secured to the chassis 125, and an optical pickup apparatus 140 which is a particular example of a pickup. The disk drive apparatus 101 further includes a pickup feeding apparatus serving as a pickup feeding section for moving the optical pickup apparatus 140 back and forth within a predetermined range in a radial direction of the optical disk toward or away from the table rotating apparatus 122, and so forth.

The optical pickup apparatus 140 includes a slide member 142 on which a two-axis actuator having a pickup lens 141 opposed to an information recording face of the optical disk is carried, electronic parts such as a laser diode and a photodiode carried on the slide member 142, optical parts such as a beam splitter and a reflecting mirror carried on the slide member 142 similarly, and so forth. Though not shown, the slide member 142 is mounted for movement toward and away from the table rotating apparatus 122 under the guidance of two guide rods disposed in parallel to each other. The table rotating apparatus 122, chassis 125, optical pickup apparatus 140, pickup feeding apparatus and associated mechanisms and parts compose the optical disk drive apparatus 101.

The disk drive apparatus 101 having such a configuration as described above is attached to a predetermined position in the outer case 102 of the optical disk type image pickup apparatus 100 shown in FIGS. 30 and 31. The turntable 123 of the table rotating apparatus 122 is disposed at a substantially central portion of the disk accommodation chamber 103, and the disk accommodation chamber 103 can be opened or closed with the disk lid 104. At this time, the disk lid 104 is locked at a lid closing position at which the disk accommodation chamber 103 is closed by the lid opening/closing mechanism. The disk accommodation chamber 103 is opened by canceling the locked state thereof.

With the optical disk type image pickup apparatus 100 having such a configuration as described above, it is possible to pick up an image of an image pickup subject to generate a digital signal corresponding to the image of the image pickup subject and cause the image to be displayed on a display apparatus such as a liquid crystal display apparatus. Further, it is possible to record an information signal corresponding to the picked up image into a built-in storage apparatus or an externally provided storage apparatus or the like.

Figure 32:
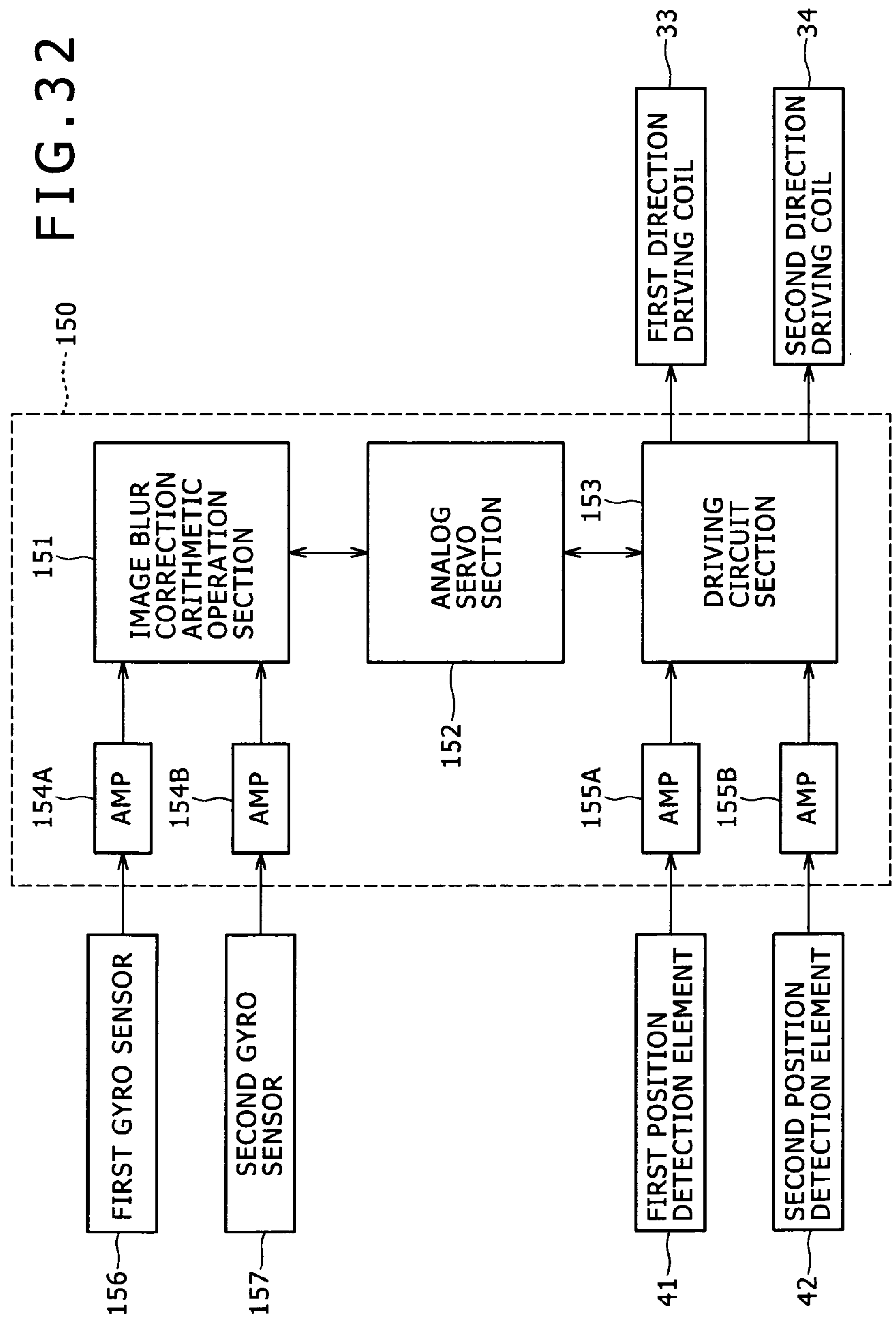
FIG. 32 is a block diagram illustrating a concept of control of the image blur correction apparatus of FIG. 8.

FIG. 32 illustrates a concept of the control of the image blur correction apparatus 5 described hereinabove. Referring to FIG. 32, the image blur correction apparatus 5 includes a control section 150 which in turn includes an image blur correction arithmetic operation section 151, an analog servo section 152, a driving circuit section 153 and four amplifiers (AMP) 154A, 154B, 155A and 155B. A first gyro sensor 156 is connected to the image blur correction arithmetic operation section 151 through the first amplifier (AMP) 154A, and a second gyro sensor 157 is connected to the image blur correction arithmetic operation section 151 through the second amplifier (AMP) 154B.

The first gyro sensor 156 detects a displacement amount of the optical disk type image pickup apparatus 100 in the first direction X caused by a shake or the like applied to the optical disk type image pickup apparatus 100. The second gyro sensor 157 detects a displacement amount of the optical disk type image pickup apparatus 100 in the second direction Y caused by a shake or the like applied to the optical disk type image pickup apparatus 100. In the image blur correction apparatus 5 shown in FIG. 32, two gyro sensors are provided to detect the displacement amount in the first direction X and the displacement amount in the second direction Y independently of each other. However, naturally a single gyro sensor may be provided to detect both of the displacement amount in the first direction X and the displacement amount in the second direction Y.

The analog servo section 152 is connected to the image blur correction arithmetic operation section 151. The analog servo section 152 converts a value calculated by the image blur correction arithmetic operation section 151 from a digital value into an analog value and outputs a control signal corresponding to the analog value. The driving circuit section 153 is connected to the analog servo section 152. The first Hall element 41 serving as the first position detection element is connected to the driving circuit section 153 through the third amplifier 155A, and the second Hall element 42 serving as the second position detection element is connected to the driving circuit section 153 through the fourth amplifier 155B. Further, the flat coil 33 serving as the driving coil for the first direction and the tubular coil 34 serving as the driving coil for the second direction are connected to the driving circuit section 153.

The displacement amount of the first movable frame 21 in the first direction X detected by the first Hall element 41 is inputted to the driving circuit section 153 through the third amplifier 155A. Meanwhile, the displacement amount of the first movable frame 21 in the second direction Y detected by the second Hall element 42 is inputted to the driving circuit section 153 through the fourth amplifier 155B. The driving circuit section 153 produces a predetermined control signal based on the input signals mentioned and a control signal from the analog servo section 152 and outputs the control signal to one or both of the flat coil 33 and the tubular coil 34 in order to move the correction lens 17 so as to correct the image blur.

Figure 33:
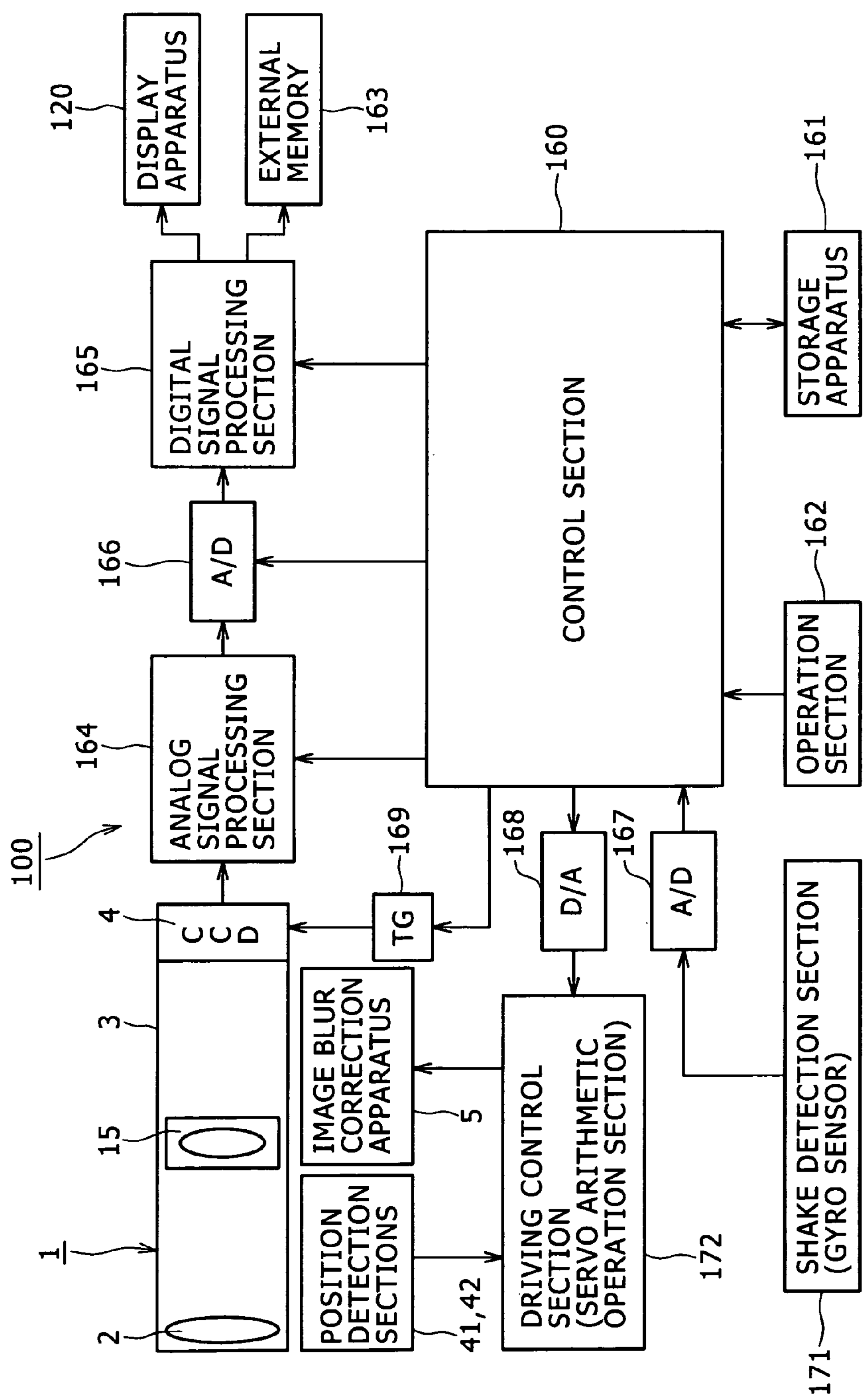
FIGS. 33 and 34 are block diagrams of different examples of a general configuration of the image pickup apparatus of FIG. 30.

FIG. 33 shows a general configuration of the optical disk type image pickup apparatus 100 which includes the image blur correction apparatus 5 having such a configuration and action as described hereinabove. Referring to FIG. 33, the optical disk type image pickup apparatus 100 includes the lens apparatus 1 having the image blur correction apparatus 5, a control section 160 serving as the center of a control apparatus, and a storage apparatus 161 including a program memory, a data memory, a RAM, a ROM and so forth for driving the control section 160. The optical disk type image pickup apparatus 100 further includes an operation section

162 for inputting various instruction signals and so forth for turning on/off of the power supply, selection of an image pickup mode, image pickup and so forth, a display apparatus 120 for displaying a picked up image and so forth, and an external memory 163 for increasing the storage capacity.

The control section 160 includes an arithmetic operation circuit including, for example, a microcomputer (CPU) and so forth. The storage apparatus 161, the operation section 162, an analog signal processing section 164, a digital signal processing section 165, two A/D converters 166 and 167, a D/A converter 168 and a timing generator (TG) 169 are connected to the control section 160. The analog signal processing section 164 is connected to the CCD element 4 attached to the lens apparatus 1 and executes a predetermined signal process in response to an analog signal corresponding to a picked up image outputted from the CCD element 4. The analog signal processing section 164 is connected to the first A/D converter 166, by which the output of the analog signal processing section 164 is converted into a digital signal.

The digital signal processing section 165 is connected to the first A/D converter 166 and executes a predetermined signal process in response to the digital signal supplied thereto from the first A/D converter 166. The display apparatus 120 and the external memory 163 are connected to the digital signal processing section 165 such that an image corresponding to an image pickup subject is displayed on the display apparatus 120 or stored into the external memory 163 in response to a digital signal outputted from the digital signal processing section 165. Further, a gyro sensor 171 which is a particular example of the blur detection section is connected to the second A/D converter 167. The gyro sensor 171 detects a shake, a swaying motion or the like of the optical disk type image pickup apparatus 100, and image blur correction is executed in response to a result of the detection by the gyro sensor 171.

A driving control section 172 serving as a servo arithmetic operation section for image blur correction is connected to the D/A converter 168. The driving control section 172 drives and controls the image blur correction apparatus 5 in response to the position of the correction lens 17 to correct image blur. The image blur correction apparatus 5 and the first Hall element 41 and second Hall element 42 which serve as a position detection section configured to detect the position of the first movable frame 21 to detect the position of the correction lens 17 are connected to the driving control section 172. It is to be noted that the timing generator 169 is connected to the CCD element 4.

Thus, when an image of an image pickup subject is inputted to the lens system 2 and formed on the image forming plane of the CCD element 4, the image signal is outputted as an analog signal and undergoes a predetermined process by the analog signal processing section 164. Then, the analog signal is converted into a digital signal by the A/D converter 166. The output of the A/D converter 166 is subject to a predetermined process by the digital signal processing section 165 and is displayed as an image corresponding to the image pickup subject on the display apparatus 120 or stored as storage information into the external memory 163.

If, in such an image pickup state as described above, the optical disk type image pickup apparatus 100 undergoes a shake, a swaying motion or the like while the image blur correction apparatus 5 is in an active state, then the gyro sensor 171 detects the shake, swaying motion or the like and outputs a detection signal to the control section 160. The control section 160 executes a predetermined arithmetic operation process to produce a control signal for controlling the action of the image blur correction apparatus 5 and outputs the control signal to the driving control section 172. Consequently, the driving control section 172 outputs a predetermined drive signal to the image blur correction apparatus 5 in accordance with the control signal from the control section 160 so that the first movable frame 21 is moved by predetermined amounts in the first direction x and the second direction Y by action of the electric actuator 23. As a result, the correction lens 17 moves in a direction in which the optical axis thereof is brought into register with the optical axis L of the lens system 2. As a result of this action of the correction lens 17, the image blur is eliminated, and a clean image can be obtained.

Figure 34:
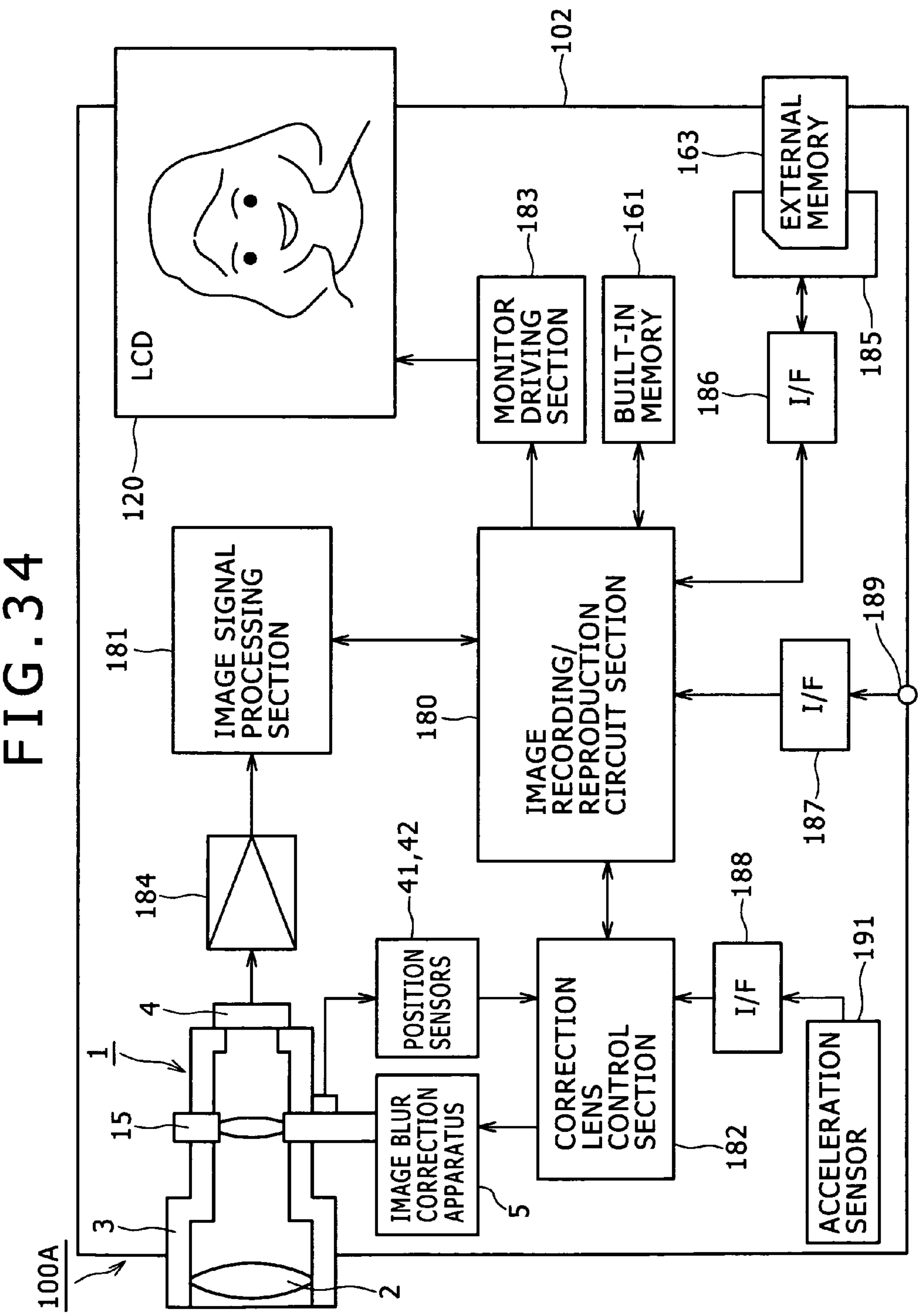

FIG. 34 shows another general configuration of the disk type image pickup apparatus 100A which includes the image blur correction apparatus 5 having such a configuration and action as described hereinabove. Referring to FIG. 34, the disk type image pickup apparatus 100A includes an outer case 102, the lens apparatus 1 having the image blur correction apparatus 5, an image recording/reproduction circuit section 180 serving as the center of a control apparatus, and a built-in memory 161 including a program memory, a data memory, a RAM, a ROM and so forth for driving the image recording/reproduction circuit section 180. The disk type image pickup apparatus 100A further includes an image signal processing section 181 for processing a picked up image and so forth into a predetermined signal, a display apparatus 120 for displaying a picked up image and so forth, an external memory 163 for expanding the storage capacity, and a correction lens control section 182 for driving and controlling the image blur correction apparatus 5.

The image recording/reproduction circuit section 180 includes an arithmetic operation circuit including, for example, a microcomputer (CPU), and so forth. The built-in memory 161, an image signal processing section 181, the correction lens control section 182, a monitor driving section 183 and two interfaces (I/F) 186 and 187 are connected to the image recording/reproduction circuit section 180. The image signal processing section 181 is connected to the CCD element 4 attached to the lens apparatus 1 through an amplifier 184, and processes a signal into a predetermined image signal and inputs the signal to the image recording/reproduction circuit section 180. The lens driving section of the image blur correction apparatus 5 for driving and controlling the correction lens 17 is connected to the correction lens control section 182, and also the two Hall elements (position sensors) 41 and 42 for detecting the position of the correction lens 17 are connected to the correction lens control section 182.

The display apparatus 120 is connected to the image recording/reproduction circuit section 180 through the monitor driving section 183. A connector 185 is connected to the first interface (I/F) 186, and the external memory 163 is removably connected to the connector 185. A connection terminal 189 provided on the display apparatus 120 is connected to the second interface (I/F) 187. Further, the correction lens control section 182 is connected to one terminal of a third interface (I/F) 188, and an acceleration sensor 191 is connected to the other terminal of the third interface (I/F) 188. The acceleration sensor 191 detects a displacement of the disk type image pickup apparatus 100A caused by a shake, a swaying motion or the like applied to the disk type image pickup apparatus 100A as an acceleration. For example, a gyro sensor can be applied as the acceleration sensor 191.

Thus, when an image of an image pickup subject is inputted to the lens system 2 and formed on the image forming plane of the CCD element 4, the image signal is inputted to the image signal processing section 181 through the amplifier 184. The image signal is processed into a predetermined image signal by the image signal processing section 181 and inputted to the image recording/reproduction circuit section 180. Consequently, a signal corresponding to the image of the image pickup subject is outputted from the image recording/reproduction circuit section 180 to the monitor driving section 183 and the built-in memory 161 or external memory 163. As a result, an image corresponding to the image of the image pickup subject is displayed on the display apparatus 120 through the monitor driving section 183 or is stored as an information signal into the built-in memory 161 or the external memory 163 as occasion demands.

If, in such an image pickup state as described above, the disk type image pickup apparatus 100A undergoes a shake, a swaying motion or the like while the image blur correction apparatus 5 is in an active state, then the acceleration sensor 191 detects the shake, swaying motion or the like and outputs a detection signal to the image recording/reproduction circuit section 180 through the correction lens control section 182. The image recording/reproduction circuit section 180 executes a predetermined arithmetic operation process to produce a control signal for controlling the action of the image blur correction apparatus 5 and outputs the control signal to the correction lens control section 182. Consequently, the correction lens control section 182 outputs a predetermined drive signal to the image blur correction apparatus 5 in accordance with the control signal from the image recording/reproduction circuit section 180 so that the first movable frame 21 is moved by predetermined amounts in the first direction X and the second direction Y. As a result the movement of the first movable frame 21, the image blur is eliminated, and a clean image can be obtained.

As described above, with the image blur correction apparatus, lens apparatus having the image blur correction apparatus and image pickup apparatus including the lens apparatus to which the present invention is applied, the image blur correction apparatus 5 is configured such that a single magnetic circuit member including the magnet 45 and the yoke 46 serves both as a magnetic circuit for a driving section for the first direction X and another magnetic circuit for another driving section for the second direction Y. Therefore, the number of parts to be used can be reduced, and the configuration of the position detection section can be simplified while the accuracy in detection of the correction lens can be improved. As a result, reduction in size and weight of the entire image blur correction apparatus can be anticipated, and reduction in size and weight of the lens apparatus which incorporates the image blur correction apparatus 5 and the entire image pickup apparatus which incorporates the lens apparatus can be anticipated.

Further, since a magnetic force uniformization element such as a projection or a recess is provided on a major side or a minor side of the yoke opposing to the magnet, the magnetic flux density at a central portion and peripheral portions of the magnet can be substantially uniformized to reduce the difference in magnetic flux density. Consequently, it is possible to eliminate an influence (interference) of the variation of the magnetic flux density detected by one of the Hall elements corresponding to the direction of the relative movement thereby to improve the accuracy in position detection. Besides, since the magnetic force uniformization section can be formed only by varying the shape or the like of the opposed yoke, no increase of the cost is requisite. It is to be noted that the projection or the recess of the magnetic force uniformization section need not necessarily be provided integrally with the yoke.

Further, since two lenses are secured to the second lens barrel 3B and the correction lens 17 is placed into and out of the position between the two lenses, the accuracy in registration of the optical axes of the lenses can be improved. Further, the second movable frame is supported on the second lens barrel 3B using a guide rod for guiding the second movable frame in the second direction and a rod engaging portion for preventing pivotal motion of the second movable frame is provided on the second lens barrel 3B, the number of parts of the guide mechanism can be reduced and a play between sliding elements can be eliminated thereby to achieve improvement of the accuracy.

Further, since the first coil (flat coil 33) for generating propelling force to drive the correction lens 17 in the first direction X and the second coil (tubular coil 34) for generating propelling force to drive the correction lens 17 in the second direction Y are secured to the first movable frame 21 and the magnet 45 for providing magnetic fluxes to the propelling force generation portions 35*a* and 35*b* and 36 is secured to the second lens barrel 3B while no movable element has a magnet thereon, the magnet 45 can be formed with an increased thickness or/and size to increase the magnetic fluxes thereby to increase the propelling force to be generated by the electric actuator 23 without increasing the mass of the movable element. This signifies that, conversely where propelling force of the same magnitude is to be generated, the number of turns of the coils can be reduced, and consequently, reduction in size of the coils can be achieved and the mass of the movable part can be reduced.

Besides, since the magnet 45 can be moved with respect to the second lens barrel 3B through the yoke 46, the outputs of the two Hall elements 41 and 42 can be adjusted by moving the position of the magnet 45. Further, since the thermistor 43 is disposed in the proximity of the two Hall elements 41 and 42, the accuracy in temperature correction can be enhanced. Further, since the wiring lines for the thermistor 43 are disposed between the driving coil of the electric actuator 23 and the Hall elements 41 and 42 for position detection, an effect same as that of a dummy pattern, that is, an effect of preventing noise generated from the wiring lines for the driving coil from having an influence on the wiring lines for the Hall elements, can be achieved.

Further, as regards the arrangement of the image blur correction apparatus 5, since the flat coil 33 of a light weight is disposed between the tubular coil 34 of the electric actuator 23 and the magnet 45 and the direction of the propelling force of the flat coil 33 which generates propelling force on the stronger side of magnetic fluxes because of the arrangement close to the magnet 45 is set so as to coincide with the side to which a higher load which is applied steadily like the gravity is applied, high propelling force can be generated with low power and reduction in power consumption in an ordinary image pickup posture with the optical axis directed in a horizontal direction can be anticipated.

While preferred embodiments of the present invention have been described above, the present invention is not limited to the specific embodiments and can be carried out in various modified forms without departing from the spirit and scope of the present invention. For example, while, in the embodiments described hereinabove, the lens apparatus is configured as a direct operation type lens, it may otherwise be configured as a foldable type lens. In this instance, since the direction of movement of the correction lens of the image blur correction apparatus can be set to a horizontal direction perpendicular to the vertical direction in which the gravity acts, the situation that the first movable frame which supports the correction lens for movement and the second movable frame which supports the first movable frame are drawn in the first and second directions by the gravity, respectively, can be eliminated. Therefore, the power consumption where an image is picked up by the image pickup apparatus while assuming a proper posture can be reduced, and the time of use of the image pickup apparatus can be increased. Besides, since the propelling force to move the correction lens can be reduced, the image pickup apparatus can cope with a more severe shake or the like, and a clean image can be obtained.

Further, in the image blur correction apparatus 5 described hereinabove, the electric actuator 23 of the moving coil type is used wherein the two coils 33 and 34 are attached to the first movable frame 21 while the magnet 45 and the yoke 46 are secured to the second lens barrel 3B and the coil side assembly is moved. However, the electric actuator may otherwise be configured as an electric actuator of the moving magnet type wherein the coils are attached to the second lens barrel 3B while the magnet is secured to the first movable frame. Further, while, in the embodiments described hereinabove, a disk type image pickup apparatus (disk type video camera) is applied as an image pickup apparatus, the present invention can be applied also to a tape type video camera, a personal computer with a camera, a portable telephone set with a camera and other image pickup apparatus.

Further, while, in the embodiments described hereinabove, a flat coil is applied as the first coil and a tubular coil is applied as the second coil, both of the first and second coils may be formed as flat coils or as tubular coils. Furthermore, while a five-group type lens apparatus is used as the lens apparatus, naturally a lens apparatus of the type of four or less lens groups or of six or more lens groups may be used.

It should be understood by those skilled in the art that various modifications, combinations, sub-combinations and alterations may occur depending on design requirements and other factor in so far as they are within the scope of the appended claims or the equivalents thereof.

The invention claimed is:

1. An image blur correction apparatus, comprising:

a correction lens capable of moving in a given direction perpendicular to an optical axis of a lens system which includes one or more lenses;

first guide means for guiding said correction lens in a first direction perpendicular to the optical axis of the lens system;

second guide means for guiding said correction lens in a second direction perpendicular to the optical axis of the lens system and also to the first direction;

first driving means for moving said correction lens along said first guide means;

second driving means for moving said correction lens along said second guide means;

position detection means for detecting the position of said correction lens;

said first and second driving means including first and second coils, a magnet configured to apply magnetic force to said first and second coils, and a yoke configured to support said magnet, said first and second coils being disposed in an intersecting relationship with each other and in an overlapping relationship with each other such that the direction of propelling force generated by a propelling force generation portion of said first coil and the direction of propelling force generated by a propelling force generation portion of said second coil are directed to the first direction and the second direction, respectively, and said position detection means detecting the magnetic force of said magnet to detect the position of said correction lens; and magnetic force uniformization means provided on at least one of said magnet and said yoke for substantially uniformizing the magnitude of the magnetic force, wherein said magnetic force uniformization means includes at least one of a recess or a projection provided on at least one of said magnet or said yoke.

2. The image blur correction apparatus according to claim 1, wherein said first and second coils are formed from a combination of a flat coil wound in a planar fashion and having a straight portion serving as one of the propelling force generation portions and a tubular coil wound so as to have a predetermined thickness in a layering direction and having a straight portion serving as the other of the propelling force generation portions.

3. The image blur correction apparatus according to claim 1, wherein said first and second coils are formed from a combination of two flat coils wound in a planar fashion and each having a straight portion serving as one of the propelling force generation portions.

4. The image blur correction apparatus according to claim 1, wherein said first and second coils are secured to a first movable frame capable of moving in the first direction under the guidance of said first guide means, and said magnet and said yoke are secured to a lens barrel on which said first movable frame is supported for movement.

5. The image blur correction apparatus according to claim 1, wherein said first coil is secured to said propelling force generation portion of said second coil and disposed such that said propelling force generation portion thereof is opposed to said magnet.

6. The image blur correction apparatus according to claim 1, wherein said magnet serves as a magnet for both of said first and second driving means which apply magnetic force to said first and second coils to generate the propelling force and as said magnet for said position detection means which detects the position of said correction lens.

7. The image blur correction apparatus according to claim 1, wherein said position detection means includes first position detection means for detecting the position of said correction lens with respect to the first direction and second position detection means for detecting the position of said correction lens with respect to the second direction, and said first and second position detection means are first and second Hall elements configured to detect the magnetic force of said magnet to detect the position of said correction lens from the position of said magnet.

8. The image blur correction apparatus according to claim 7, wherein said magnet is a rectangular plate-like member having four sides two of which extend in a direction perpendicular to the first direction and the other two of which extend in a direction perpendicular to the second direction, said first Hall element moving relative to said magnet in the first direction to detect a variation of the magnetic force by said magnet, said second Hall element moving relative to said magnet in the second direction to detect a variation of the magnetic force by said magnet, and said position detection means detecting the position of said correction lens based on a result of the detection by said first and second Hall elements.

9. The image blur correction apparatus according to claim 7, wherein said first and second Hall elements are secured to said first movable frame, and said image blur correction apparatus further comprises:

temperature detection means disposed between said first and second Hall elements for detecting an environmental temperature; and correction means for correcting the result of the detection of said first and second Hall elements based on the temperature detected by said temperature detection means.

10. The image blur correction apparatus according to claim 1, wherein said magnetic force uniformization means includes a coating for suppressing or promoting transmission of the magnetic force, said coating being provided by applying the coating to a predetermined position of at least one of said magnet and said yoke.

11. The image blur correction apparatus according to claim 1, wherein said magnetic force uniformization means includes a seal member for suppressing or promoting transmission of the magnetic force, said seal member being provided by adhesion of the seal member to a predetermined position of at least one of said magnet and said yoke.

12. A lens apparatus, comprising:

a lens barrel configured to support a lens system including one or more lenses fixedly and/or movably; and an image blur correction apparatus, including:

a correction lens removably mounted in said lens barrel and movable in a given direction perpendicular to an optical axis of said lens system, first guide means for guiding said correction lens in a first direction perpendicular to the optical axis of said lens system, second guide means for guiding said correction lens in a second direction perpendicular to the optical axis of said lens system and also to the first direction, first driving means for moving said correction lens along said first guide means, second driving means for moving said correction lens along said second guide means, position detection means for detecting the position of said correction lens, said first and second driving means including first and second coils, a magnet configured to apply magnetic force to said first and second coils, and a yoke configured to support said magnet, said first and second coils being disposed in an intersecting relationship with each other and in an overlapping relationship with each other such that the direction of propelling force generated by a propelling force generation portion of said first coil and the direction of propelling force generated by a propelling force generation portion of said second coil are directed to the first direction and the second direction, respectively, said position detection means detecting the magnetic force of said magnet to detect the position of said correction lens, and magnetic force uniformization means provided on at least one of said magnet and said yoke for substantially uniformizing the magnitude of the magnetic force, wherein said magnetic force uniformization means includes at least one of a recess or a projection provided on at least one of said magnet or said yoke.

13. An image pickup apparatus, comprising:

a lens apparatus, including a lens barrel configured to support a lens system including one or more lenses fixedly and/or movably, and an image blur correction apparatus, including:

a correction lens removably mounted in said lens barrel and movable in a given direction perpendicular to an optical axis of said lens system, first guide means for guiding said correction lens in a first direction perpendicular to the optical axis of said lens system, second guide means for guiding said correction lens in a second direction perpendicular to the optical axis of said lens system and also to the first direction, first driving means for moving said correction lens along said first guide means, second driving means for moving said correction lens along said second guide means, position detection means for detecting the position of said correction lens, said first and second driving means including first and second coils, a magnet configured to apply magnetic force to said first and second coils, and a yoke configured to support said magnet, said first and second coils being disposed in an intersecting relationship with each other and in an overlapping relationship with each other such that the direction of propelling force generated by a propelling force generation portion of said first coil and the direction of propelling force generated by a propelling force generation portion of said second coil are directed to the first direction and the second direction, respectively, said position detection means detecting the magnetic force of said magnet to detect the position of said correction lens, and magnetic force uniformization means provided on at least one of said magnet and said yoke for substantially uniformizing the magnitude of the magnetic force, wherein said magnetic force uniformization means includes at least one of a recess or a projection provided on at least one of said magnet or said yoke.

* * * * *